(12) United States Patent
Hughes

(10) Patent No.: US 11,366,436 B2
(45) Date of Patent: Jun. 21, 2022

(54) DATA INTERACTION PLATFORMS UTILIZING SECURITY ENVIRONMENTS

(71) Applicant: DSi Digital, LLC, Peachtree Corners, GA (US)

(72) Inventor: Anthony Mitchell Hughes, Alpharetta, GA (US)

(73) Assignee: DSI DIGITAL, LLC, Peachtree Corners, GA (US)

( * ) Notice: Subject to any disclaimer, the term of this patent is extended or adjusted under 35 U.S.C. 154(b) by 186 days.

(21) Appl. No.: 16/699,853

(22) Filed: Dec. 2, 2019

(65) Prior Publication Data

US 2020/0175181 A1    Jun. 4, 2020

Related U.S. Application Data

(60) Provisional application No. 62/774,569, filed on Dec. 3, 2018, provisional application No. 62/774,573, filed
(Continued)

(51) Int. Cl.
*G06F 21/60* (2013.01)
*G05B 13/04* (2006.01)
(Continued)

(52) U.S. Cl.
CPC ......... *G05B 13/048* (2013.01); *G06F 16/212* (2019.01); *G06F 16/248* (2019.01);
(Continued)

(58) Field of Classification Search
CPC ... G06F 21/604; G06F 21/6209; H04L 63/105
See application file for complete search history.

(56) References Cited

U.S. PATENT DOCUMENTS 6,405,364 B1   6/2002  Bowan-Amuah
6,584,184 B1 * 6/2003  Nabkel ............... H04M 3/387
                                          379/201.01
(Continued)

FOREIGN PATENT DOCUMENTS

CN        108229440 A    6/2018

OTHER PUBLICATIONS

NonFinal Office Action for U.S. Appl. No. 16/699,892, dated Jun. 17, 2021, (13 pages), United States Patent and Trademark Office, USA.
(Continued)

*Primary Examiner* — Vance M Little
(74) *Attorney, Agent, or Firm* — Alston & Bird LLP

(57) ABSTRACT

There is a need for solutions for efficiently and reliably maintain data security policies. This need can be addressed by, for example, solutions for performing dynamic security enforcement in a data interaction platform. In one example, a method includes determining a security profile for a data object; receiving a data access request associated with the data object, wherein the data access request is associated with one or more runtime parameters associated with the data access request; determining, based at least in part on the one or more runtime parameters; determining, based at least in part on the selected security environment and the security profile, a selected access level of the plurality of access levels for the data object; and processing the data access request based at least in part on the selected access level.

19 Claims, 30 Drawing Sheets

Related U.S. Application Data on Dec. 3, 2018, provisional application No. 62/774,579, filed on Dec. 3, 2018, provisional application No. 62/774,602, filed on Dec. 3, 2018.

(51) Int. Cl.

| | | |
|---|---|---|
| *G06N 5/04* | (2006.01) | |
| *G06N 7/00* | (2006.01) | |
| *G06N 3/02* | (2006.01) | |
| *G06F 21/62* | (2013.01) | |
| *H04L 9/40* | (2022.01) | |
| *G06F 16/28* | (2019.01) | |
| *G06N 20/00* | (2019.01) | |
| *G06F 16/26* | (2019.01) | |
| *G06F 16/248* | (2019.01) | |
| *G06F 16/2457* | (2019.01) | |
| *G06F 16/2458* | (2019.01) | |
| *G06F 16/21* | (2019.01) | |
| *G06V 30/194* | (2022.01) | |
| *G06F 3/0482* | (2013.01) | |
| *G06F 3/0484* | (2022.01) | |

(52) U.S. Cl.
CPC .... *G06F 16/2458* (2019.01); *G06F 16/24573* (2019.01); *G06F 16/24578* (2019.01); *G06F 16/26* (2019.01); *G06F 16/282* (2019.01); *G06F 16/287* (2019.01); *G06F 16/288* (2019.01); *G06F 16/289* (2019.01); *G06F 21/604* (2013.01); *G06F 21/6209* (2013.01); *G06N 3/02* (2013.01); *G06N 5/04* (2013.01); *G06N 7/005* (2013.01); *G06N 20/00* (2019.01); *G06V 30/194* (2022.01); *H04L 63/105* (2013.01); *G06F 3/0482* (2013.01); *G06F 3/0484* (2013.01)

(56) References Cited

U.S. PATENT DOCUMENTS

| | | | |
|---|---|---|---|
| 7,389,208 B1 | 6/2008 | Solinsky | |
| 10,739,955 B2 | 8/2020 | Wang et al. | |
| 2001/0048217 A1 | 12/2001 | Seip | |
| 2002/0083072 A1 | 6/2002 | Steuart | |
| 2003/0154381 A1* | 8/2003 | Ouye | H04L 63/12 713/182 |
| 2005/0060048 A1 | 3/2005 | Pierre et al. | |
| 2008/0148340 A1* | 6/2008 | Powell | H04L 63/0227 726/1 |
| 2009/0292755 A1 | 11/2009 | Waagen et al. | |
| 2011/0167479 A1* | 7/2011 | Maes | G06F 21/6281 726/4 |
| 2014/0250534 A1* | 9/2014 | Flores | G06F 21/6209 726/26 |
| 2014/0297268 A1 | 10/2014 | Govrin | |
| 2014/0379615 A1 | 12/2014 | Brigham et al. | |
| 2014/0380285 A1 | 12/2014 | Gabel et al. | |
| 2015/0347746 A1 | 12/2015 | Martel et al. | |
| 2016/0026253 A1 | 1/2016 | Bradski et al. | |
| 2016/0092691 A1* | 3/2016 | Thom | G06F 21/6218 726/1 |
| 2016/0182529 A1 | 6/2016 | Biehl et al. | |
| 2016/0224664 A1 | 8/2016 | Noren et al. | |
| 2016/0248809 A1* | 8/2016 | Smith | H04L 63/20 |
| 2016/0378919 A1 | 12/2016 | McNutt et al. | |
| 2017/0032017 A1 | 2/2017 | Morinaga et al. | |
| 2017/0220582 A1 | 8/2017 | McCann et al. | |
| 2017/0323028 A1 | 11/2017 | Jonker et al. | |
| 2017/0351241 A1 | 12/2017 | Bowers et al. | |
| 2017/0364534 A1 | 12/2017 | Zhang et al. | |
| 2018/0046714 A1 | 2/2018 | Blaas | |
| 2019/0058682 A1* | 2/2019 | MacAskill | G06F 16/9535 |
| 2019/0073406 A1 | 3/2019 | Xu et al. | |
| 2019/0121350 A1 | 4/2019 | Celia et al. | |
| 2019/0129732 A1 | 5/2019 | Sivertson | |
| 2019/0158498 A1* | 5/2019 | Brouillette | G06F 21/604 |
| 2019/0213282 A1 | 7/2019 | Perumal et al. | |

OTHER PUBLICATIONS

NonFinal Office Action for U.S. Appl. No. 16/699,881, filed Feb. 5, 2021, (27 pages), United States Patent and Trademark Office, USA.

Huth, Alexander G. et al. *A Continuous Semantic Space Describes the Representation of Thousands of Object and Action Categories Across the Human Brain*, Neuron, vol. 76, Issue 6, pp. 1210-1224, Dec. 20, 2012. DOI: https://doi.org/10.1016/j.neuron.2012.10.014.

Thaler, S.L. *Autonomous Implemented Materials Discovery Via Spreedsheet-Implemented Neural Network Cascades*, (11 pages), [article, online], [retrieved from the Internet Dec. 31, 2019] <https://www.tms.org/pubs/journals/JOM/9704/Thaler/Thaler-9704.html>.

*Building Information Model*, Wikipedia, (19 pages), [online], [retrieved from the Internet Dec. 31, 2019] <https://en.wikipedia.org/wiki/Building_informantion_modeling>.

*DARPA Perspective on Artificial Intelligence*, Defense Advanced Research Projects Agency, (2 pages), [article, online], [retrieved from the Internet Dec. 31, 2019] <https://www.darpa.mil/about-us/darpa-perspective-on-ai>.

Kanner, Josh et al. *Get Ready for Artificial Intelligence in Construction*, Autodesk University, (5 pages), [article, online], [retrieved from the Internet Dec. 31, 2019] <https://www.autodesk.com/autodesk-university/class/Get-Ready-Artificial-Intelligence-Construction-2017#chapter>.

Huth, Alexander G. *Natural Speech Reveals the Semantic Maps that tile Human Cerebral Cortex*, Nature, vol. 532, pp. 453-458, Apr. 28, 2016. DOI: 10.1038/nature17637.

Mac Carron, Pádraig et al. *Calling Dunbar's Numbers*, Elsevier Social Networks, vol. 47, pp. 151-155 (2016). DOI:10.1016/j.socnet.2016.06.003.

*Mobile Attribution Platform & Mobile App Analytics*, Kochava, (7 pages), [online], [retrieved from the Internet Dec. 31, 2019] <https://www.kochava.com/>.

*Probabilistic Programming*, (10 pages), [article, online], [retrieved from the Internet Dec. 31, 2019] <http://www.cs.cornell.edu/courses/cs4110/2016fa/lectures/lecture33.html>.

Cabrera, Derek, *Relationships (R ) Are Not Enough!*, (7 pages), [article, online], [retrieved from the Internet Dec. 31, 2019] <https://stdaily.ghost.io/relationships-r-are-not-enough/>.

*What Is A Graph Database and Property Graph*, Neo4J, (6 pages), [article, online], [retrieved from the Internet Dec. 31, 2019] <https://neo4j.com/developer/graph-database/>.

International Searching Authority, International Search Report and Written Opinion for International Application No. PCT/US2019/064019, dated Feb. 4, 2020, (16 pages), European Patent Office, Rijswijk, The Netherlands.

International Searching Authority, International Search Report and Written Opinion for International Application No. PCT/US2019/064014, dated Feb. 24, 2020, (15 pages), European Patent Office, Rijswijk, The Netherlands.

Liu, Jie et al. *An Integrated Multi-Sensor Fusion-Based Deep Feature Learning Approach For Rotating Machinery Diagnosis*, Measurement Science and Technology, IOP Publishing, vol. 29, No. 5:055103, Mar. 23, 2018, pp. 1-12. XP020326551, ISSN: 0957-0233, DOI: 10.1088/1361-6501/AAACA6.

Roemer, Michael J. et al. *Assessment of Data and Knowledge Fusion Strategies For Prognostics and Health Management*, . In 2001 IEEE Aerospace Conference Proceedings (Cat. No. 01TH8542), vol. 6, Mar. 10-17, 2001, pp. 2979-2988. XP010548420, ISBN: 978-0-7803-6599-5.

Van Cleeff, André et al. *Benefits of Location-Based Access Control: A Literature Study*, 2010 IEEE/ACM International Conference on Green Computing and Communications & 2010 IEEE/ACM International Conference on Cyber, Physical and Social Computing, Dec. 18, 2010, pp. 739-746. XP031923565. ISBN: 978-1-4244-9779-9, DOI: 10.1109/GREENCOM-CPSCOM.2010.148.

(56) References Cited

OTHER PUBLICATIONS

Mees, Oier et al. *Choosing Smartly: Adaptive Multimodal Fusion for Object Detection in Changing enviroments*, Cornell University Library, arXiv:1707.05733v2 [cs.RO], Nov. 19, 2019, (6 pages). XP081560832, DOI: 10.1109/IROS.2016.7759048.

Ge, Chenjie et al. *Deep Learning and Multi-Sensor Fusion for Glioma Classification Using Multistream 2D Convolutional Networks*, 2018 40th Annual International Conference of the IEEE Engineering in Medicine and Biology Socity (EMBC), Jul. 18, 2018, pp. 5894-5897. XP033429601, DOI: 10.1109/EMBC.2018.8513556.

Vielzeuf, Valentin et al. *Multi-Level Sensor Fusion With Deep Learning*, arXiv: 1811.02447v1 [cs.CV], Nov. 7, 2018, pp. 1-12. XP055661381, DOI: 10.1109/LSENS.2018/2878908.

Notice of Allowance and Fee(s) Due for U.S. Appl. No. 16/699,874, dated Jun. 16, 2021, (21 pages), United States Patent and Trademark Office, USA.

International Searching Authority, International Search Report and Written Opinion for International Application No. PCT/US2019/064000, dated Jan. 29, 2020, (14 pages), European Patent Office, Rijswijk, The Netherlands.

International Searching Authority, International Search Report and Written Opinion for International Application No. PCT/US2019/064007, dated Jan. 29, 2020, (14 pages), European Patent Office, Rijswijk, The Netherlands.

International Searching Authority, International Search Report and Written Opinion for International Application No. PCT/US2019/064009, dated Jan. 29, 2020, (15 pages), European Patent Office, Rijswijk, The Netherlands.

Kaur, Karamjit et al. *Modeling and Querying Data In NoSQL Databases*, 2013 IEEE International Conference on Big Data, Oct. 6, 2013, pp. 1-7, IEEE. XP032535034. DOI: 10.1109/BIGDATA.2013.6691765.

Notice of Allowance and Fee(s) Due for U.S. Appl. No. 16/699,838, dated Mar. 23, 2022, (15 pages), United States Patent and Trademark Office, USA.

\* cited by examiner

DATA INTERACTION PLATFORMS UTILIZING SECURITY ENVIRONMENTS

CROSS-REFERENCES TO RELATED APPLICATIONS

The present application claims priority to U.S. Provisional Patent Application Nos. 62/774,569, 62/774,573, 62/774,579, and 62/774,602, all filed on Dec. 3, 2018, and all of which are incorporated herein by reference in their entireties.

BACKGROUND

Various embodiments of the present invention address technical challenges related to data security. Existing data modeling solutions are ill-suited to efficiently and reliably maintain data security policies. Various embodiments of the present invention address the shortcomings of noted data modeling solutions and disclose various techniques for efficiently and reliably maintaining data security policies in data modeling solutions.

BRIEF SUMMARY

In general, embodiments of the present invention provide methods, apparatus, systems, computing devices, computing entities, and/or the like efficiently and reliably maintaining data security policies. Certain embodiments utilize systems, methods, and computer program products that maintain data security policies using at least one of security environments, security profiles, security features, and security model extrapolation spaces.

In accordance with one aspect, a method is provided. In one embodiment, the method comprises: determining a security profile for a data object, wherein: (i) the security profile defines one or more access criteria for the data object, and (ii) each access criterion of the plurality of access criteria relates an access level of one or more access levels for the data object to a security environment of one or more security environments associated with a data interaction platform computing entity; receiving a data access request associated with the data object, wherein the data access request is associated with one or more runtime parameters associated with the data access request; determining, based at least in part on the one or more runtime parameters, a selected security environment for the data access request, wherein the selected security environment is selected from the plurality of security environments associated with the data interaction platform computing entity; determining, based at least in part on the selected security environment and the security profile, a selected access level of the plurality of access levels for the data object; and processing the data access request based at least in part on the selected access level by generating a refined version of the data object in accordance with the selected access level and providing the refined version to a client computing entity associated with the data access request.

In accordance with another aspect, a computer program product is provided. The computer program product may comprise at least one computer-readable storage medium having computer-readable program code portions stored therein, the computer-readable program code portions comprising executable portions configured to: determine a security profile for a data object, wherein: (i) the security profile defines one or more access criteria for the data object, and (ii) each access criterion of the plurality of access criteria relates an access level of one or more access levels for the data object to a security environment of one or more security environments associated with a data interaction platform computing entity; receive a data access request associated with the data object, wherein the data access request is associated with one or more runtime parameters associated with the data access request; determine, based at least in part on the one or more runtime parameters, a selected security environment for the data access request, wherein the selected security environment is selected from the plurality of security environments associated with the data interaction platform computing entity; determine, based at least in part on the selected security environment and the security profile, a selected access level of the plurality of access levels for the data object; and process the data access request based at least in part on the selected access level by generating a refined version of the data object in accordance with the selected access level and providing the refined version to a client computing entity associated with the data access request.

In accordance with yet another aspect, an apparatus comprising at least one processor and at least one memory including computer program code is provided. In one embodiment, the at least one memory and the computer program code may be configured to, with the processor, cause the apparatus to: determine a security profile for a data object, wherein: (i) the security profile defines one or more access criteria for the data object, and (ii) each access criterion of the plurality of access criteria relates an access level of one or more access levels for the data object to a security environment of one or more security environments associated with a data interaction platform computing entity; receive a data access request associated with the data object, wherein the data access request is associated with one or more runtime parameters associated with the data access request; determine, based at least in part on the one or more runtime parameters, a selected security environment for the data access request, wherein the selected security environment is selected from the plurality of security environments associated with the data interaction platform computing entity; determine, based at least in part on the selected security environment and the security profile, a selected access level of the plurality of access levels for the data object; and process the data access request based at least in part on the selected access level by generating a refined version of the data object in accordance with the selected access level and providing the refined version to a client computing entity associated with the data access request.

BRIEF DESCRIPTION OF THE DRAWINGS

Figure 1:
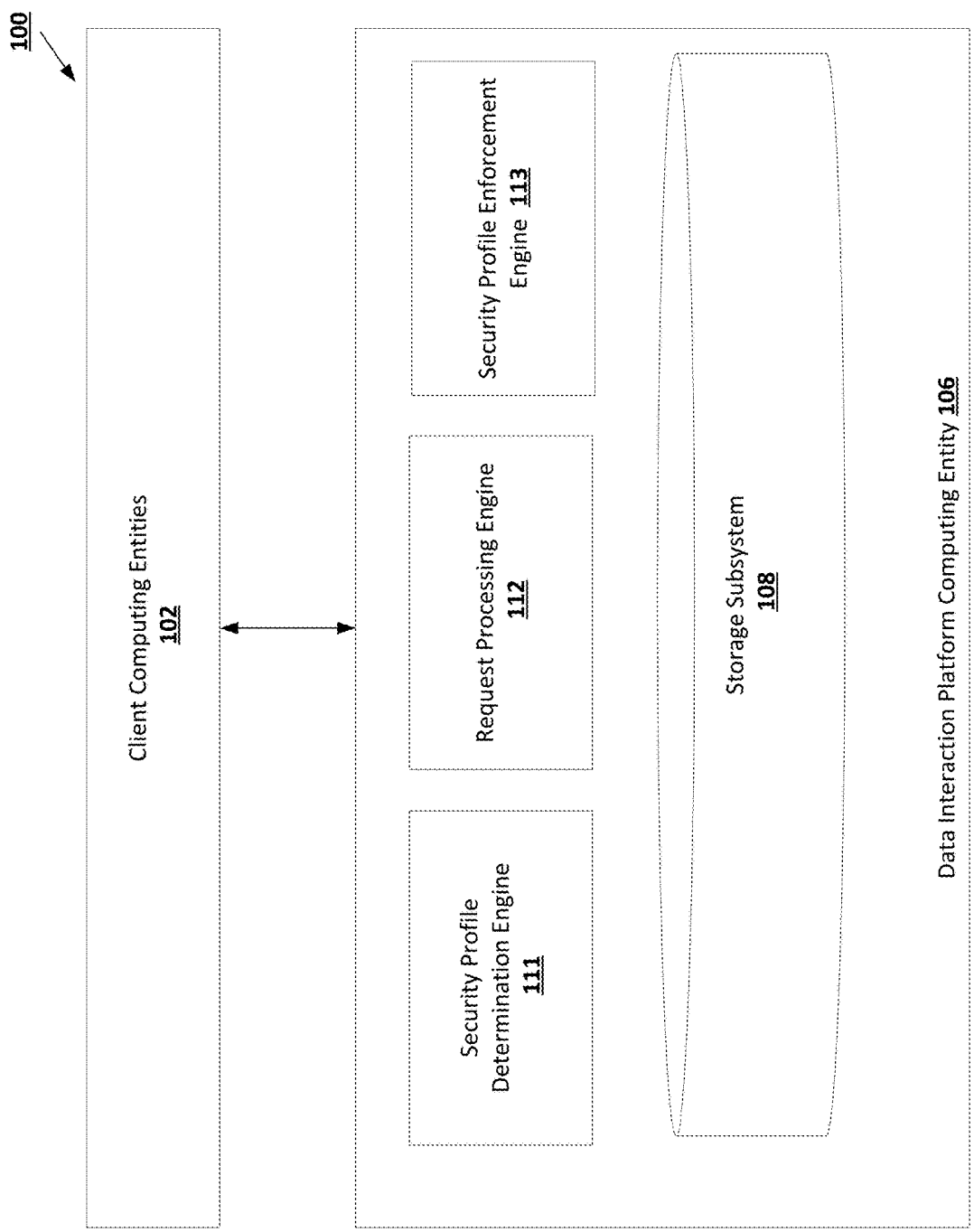

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
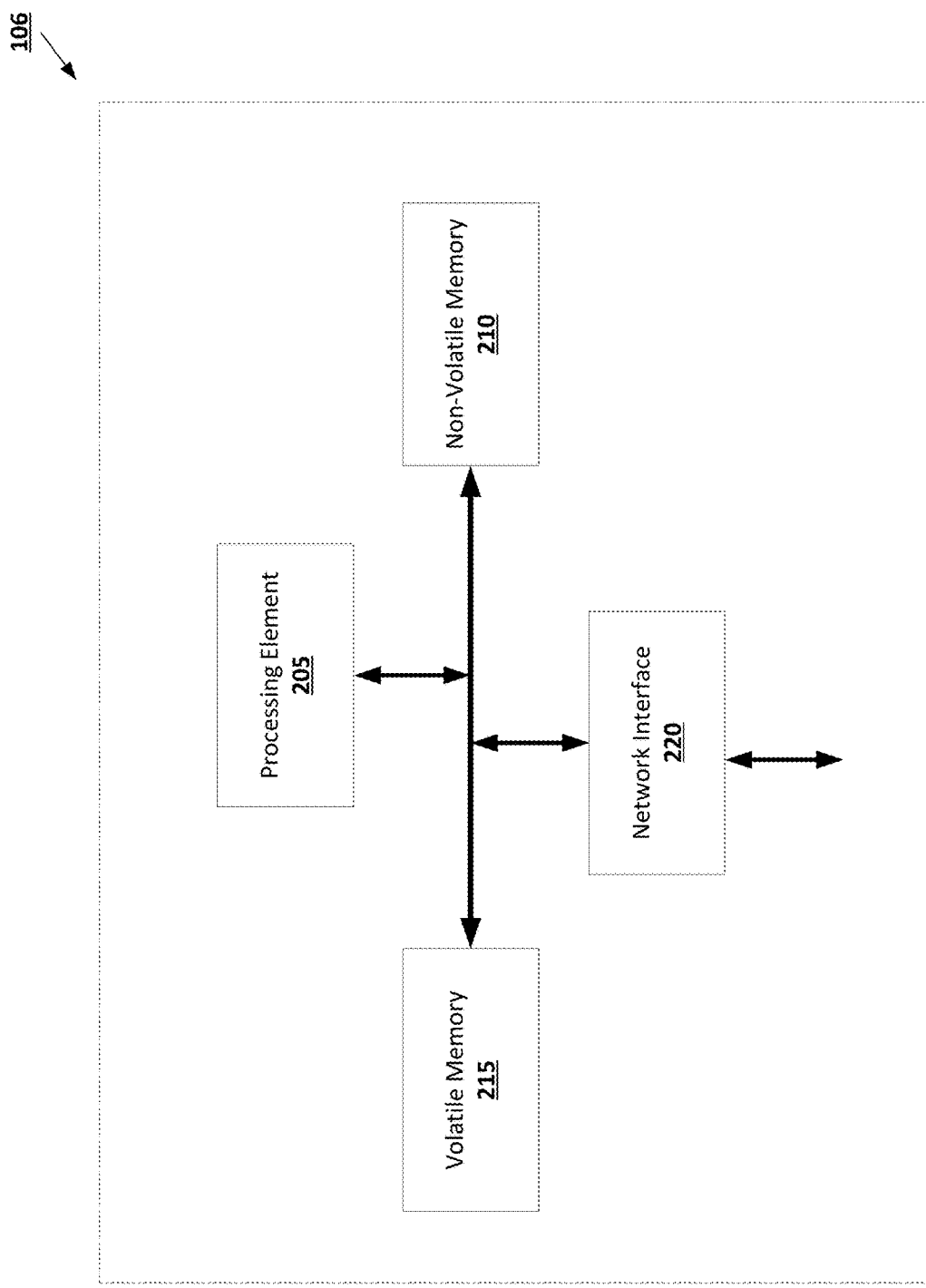

FIG. 2 provides an example data interaction platform computing entity in accordance with some embodiments discussed herein.

Figure 3:
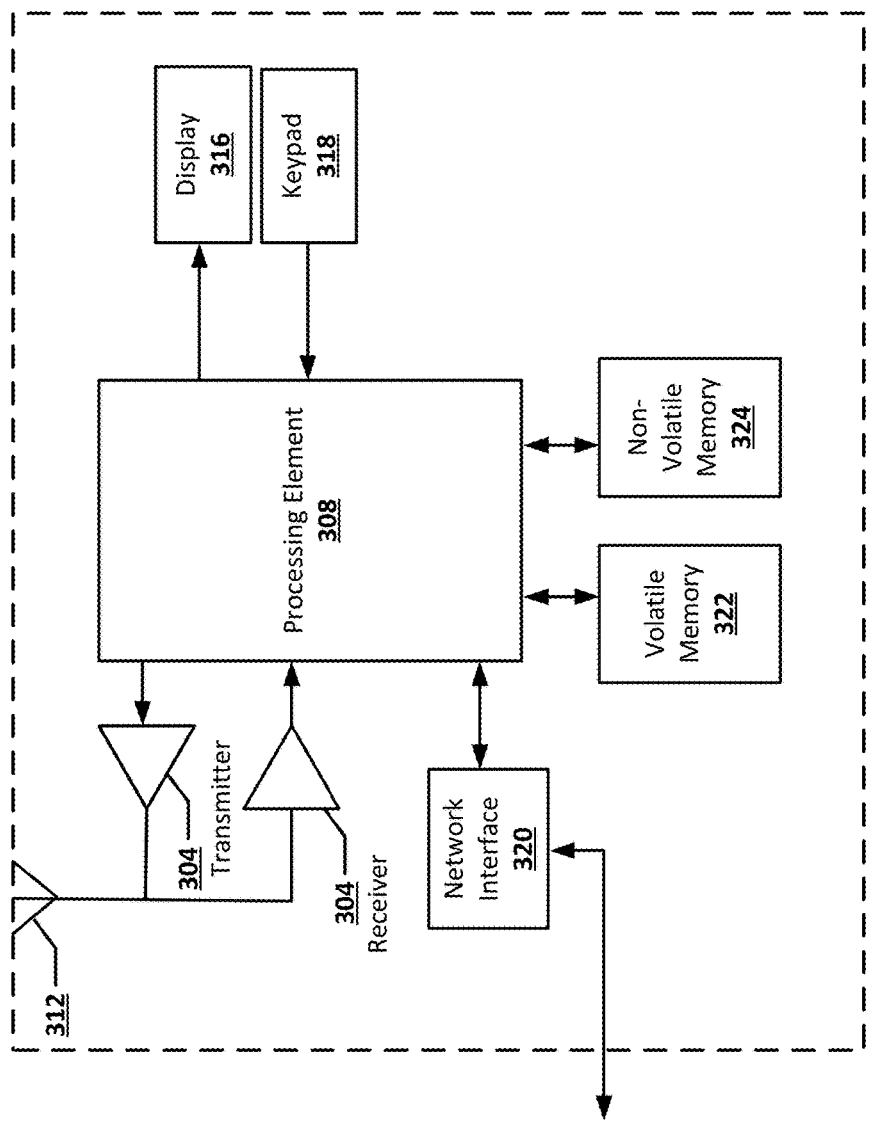

FIG. 3 provides an example client computing entity in accordance with some embodiments discussed herein.

Figure 4:
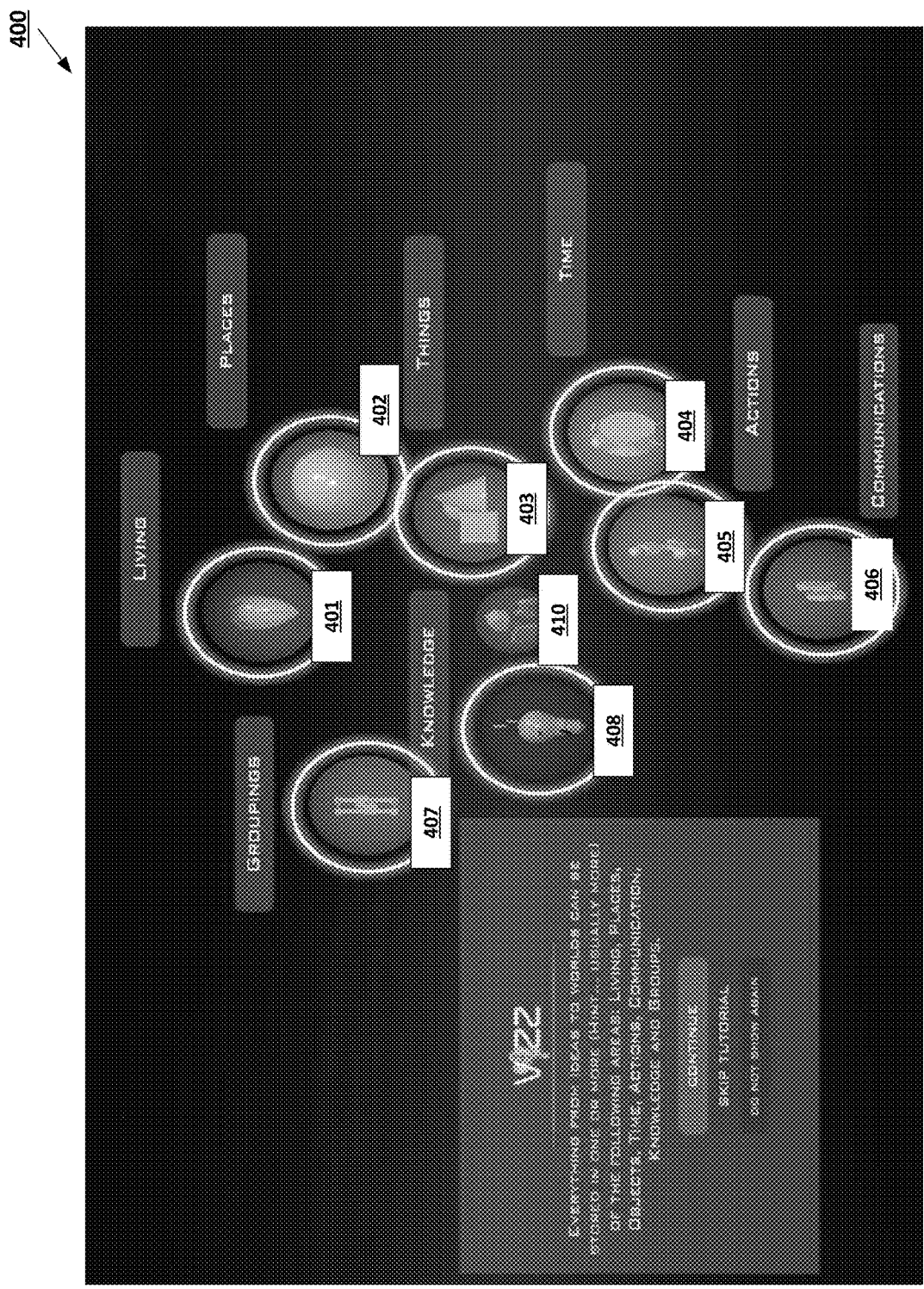

FIG. 4 provides an operational example of a user interface for a data interaction platform in accordance with some embodiments discussed herein.

Figure 5:
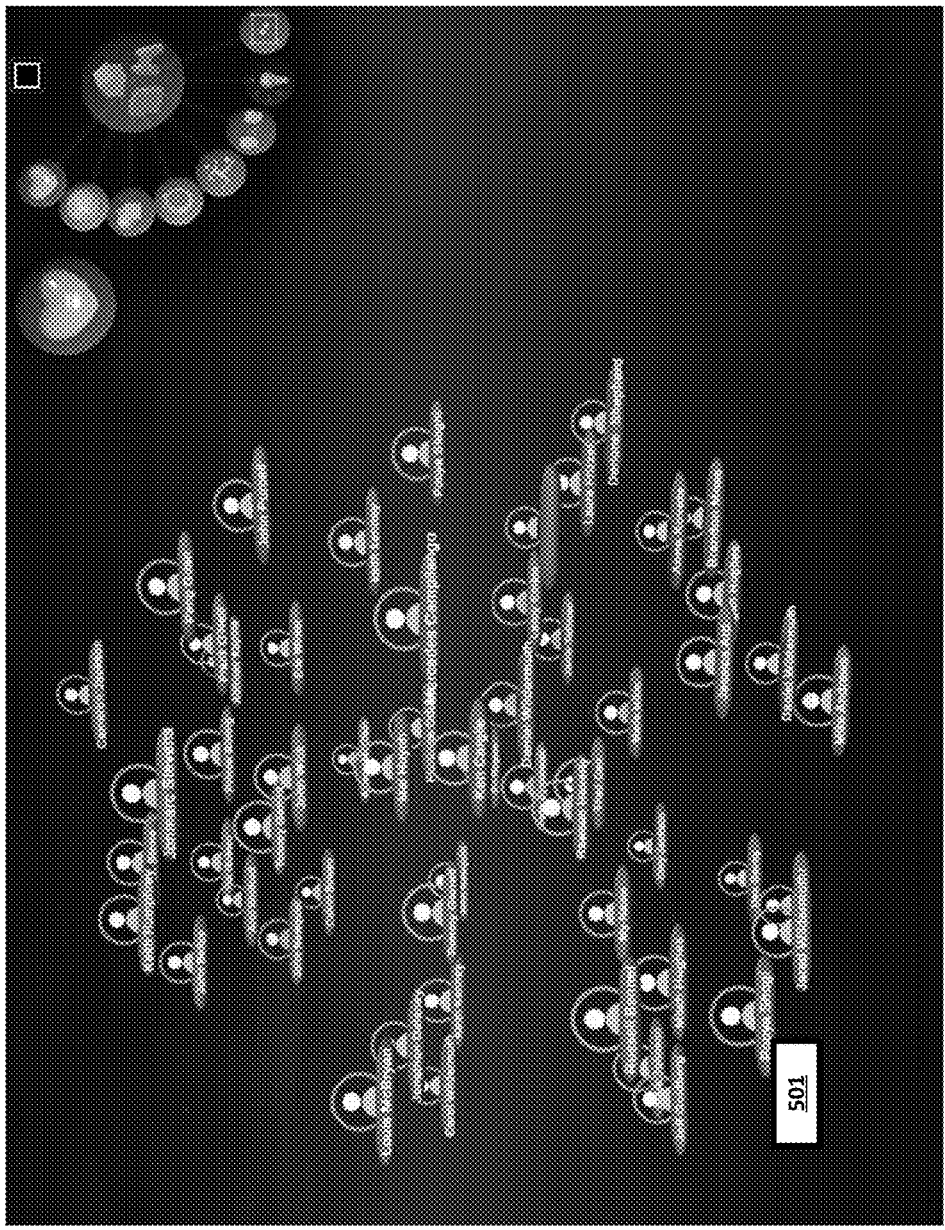

FIG. 5 provides an operational example of a user interface for a multi-object visualization space for various living data objects in accordance with some embodiments discussed herein.

Figure 6:
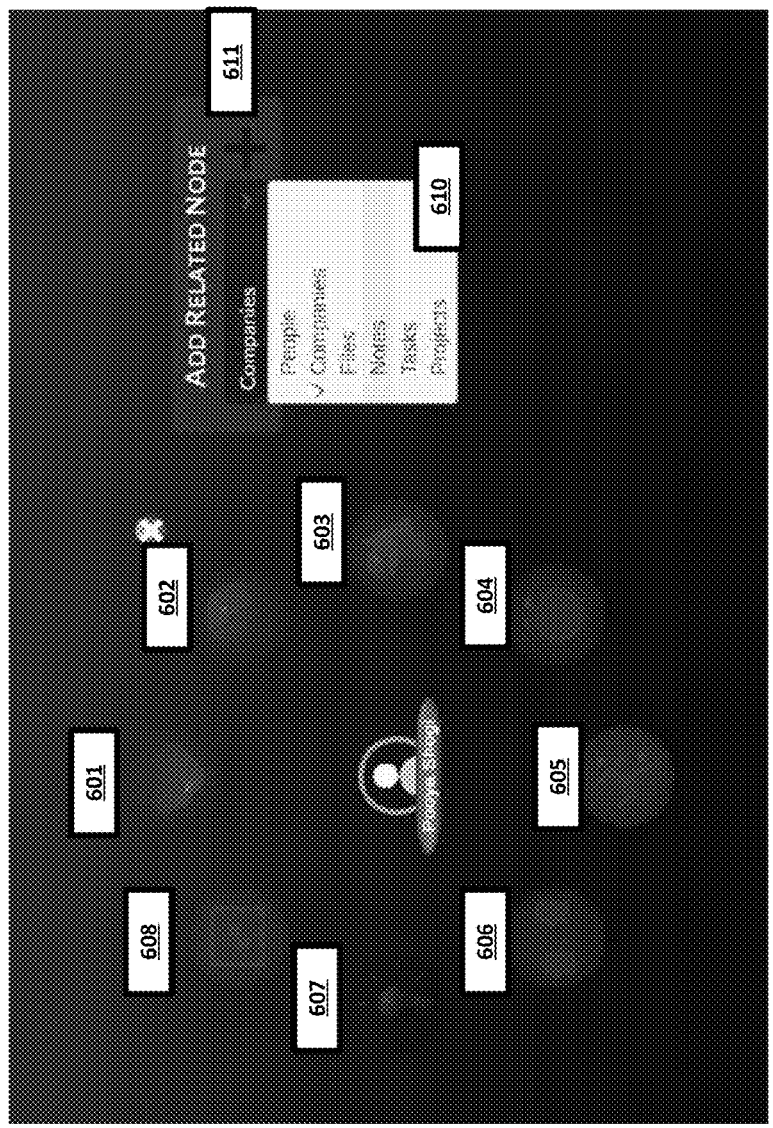

FIG. 6 provides an operational example of a user interface for a per-object visualization space for a living data object in accordance with some embodiments discussed herein.

Figure 7:
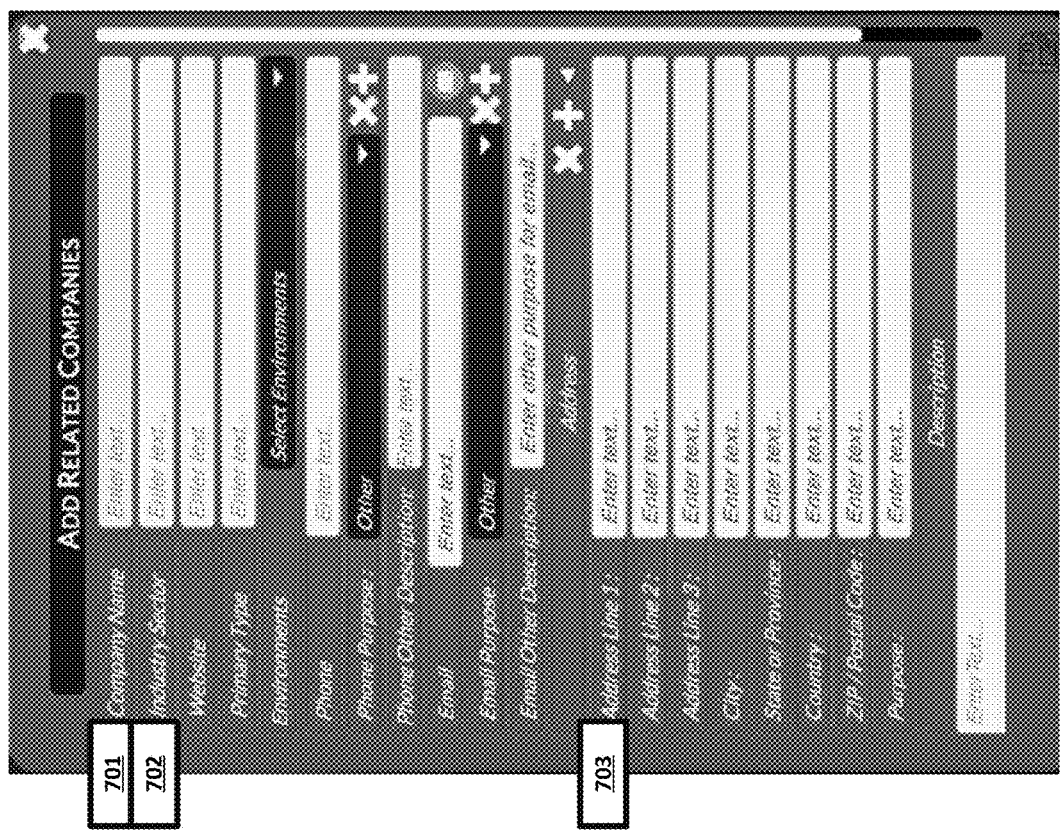

FIG. 7 provides an operational example of a user interface for adding a data object to a data model in accordance with some embodiments discussed herein.

Figure 8:
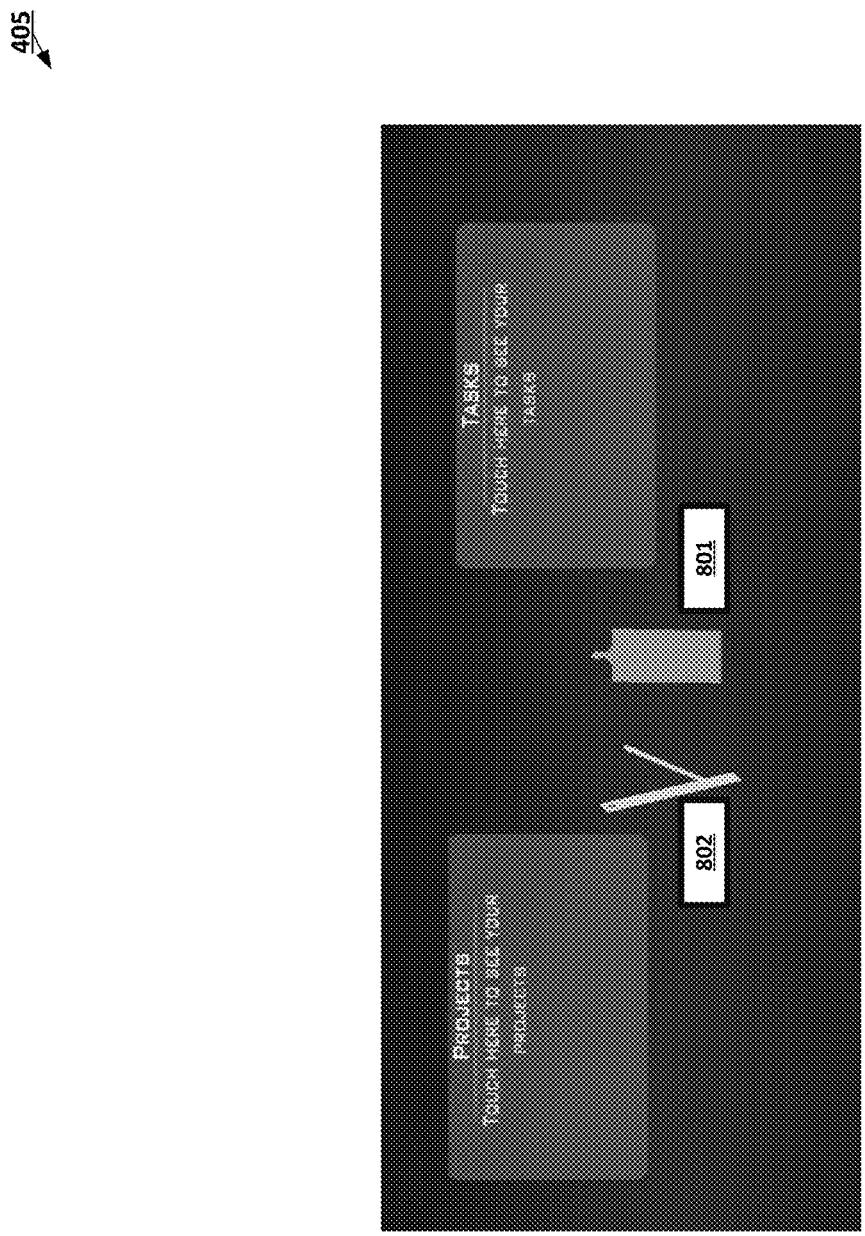

FIG. 8 provides an operational example of a user interface for hierarchical division of actions data objects in accordance with some embodiments discussed herein.

Figure 9:
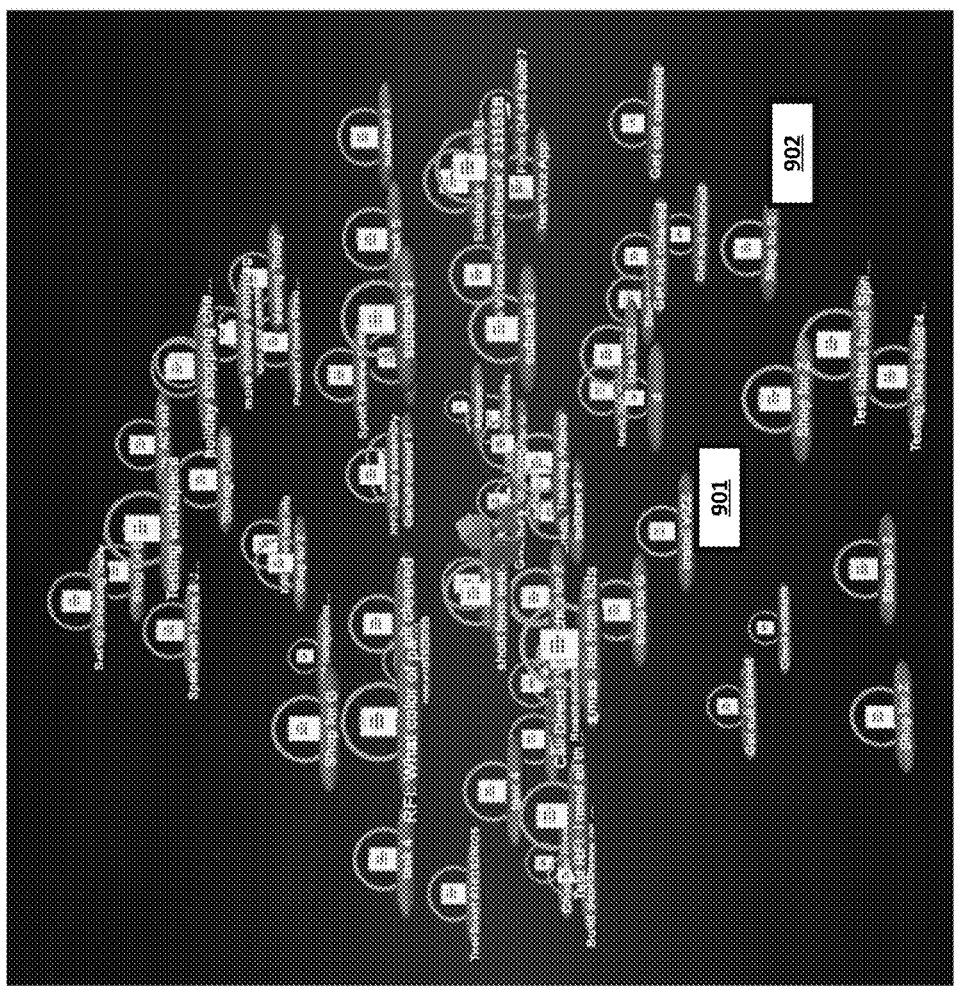

FIG. 9 provides an operational example of a user interface for a multi-object visualization space for various tasks data objects in accordance with some embodiments discussed herein.

Figure 10:
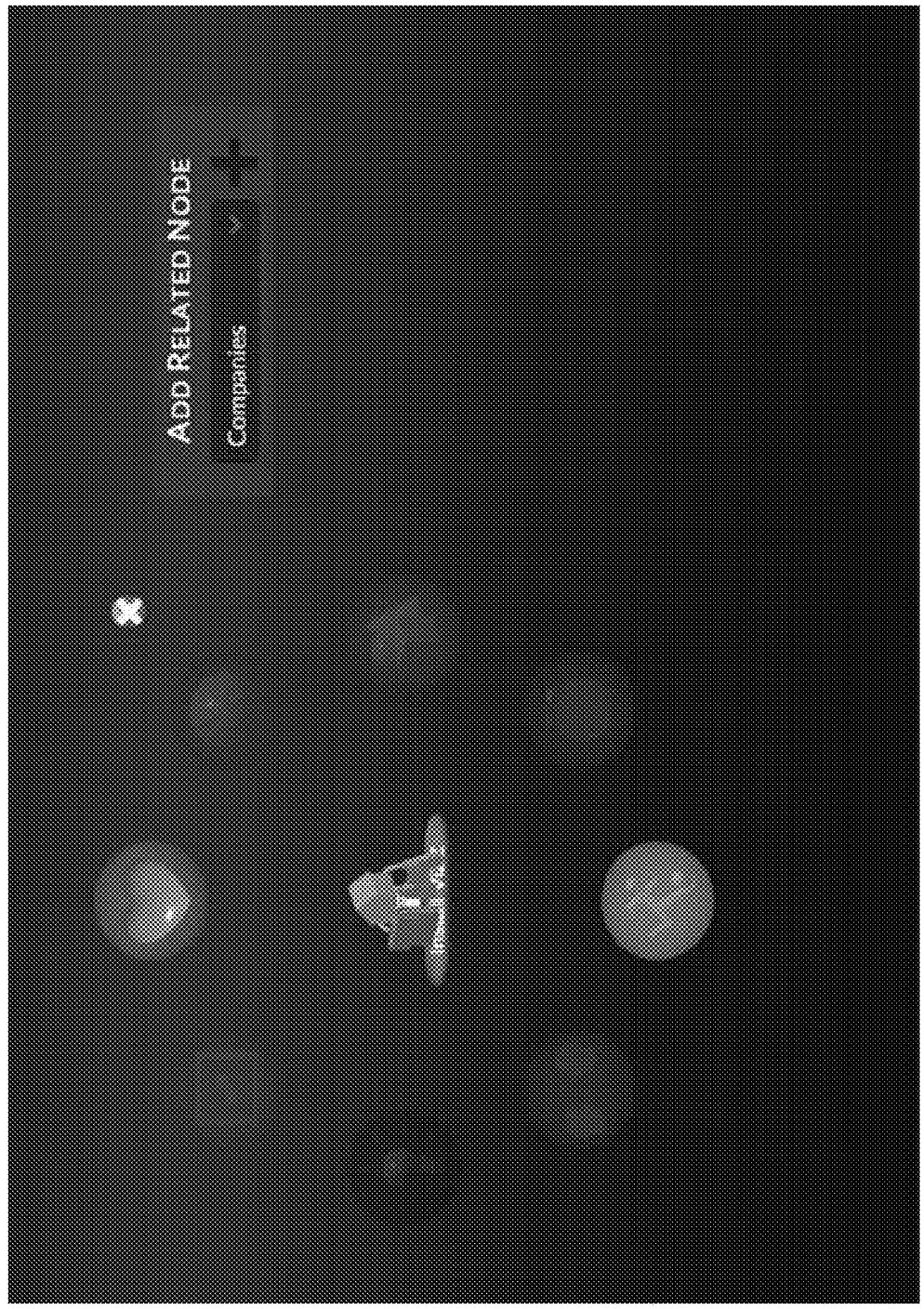

FIG. 10 provides an operational example of a user interface for a per-object visualization space for a tasks data object in accordance with some embodiments discussed herein.

Figure 11:

FIG. 11 provides an operational example of a user interface for hierarchical division of knowledge data objects in accordance with some embodiments discussed herein.

Figure 12:
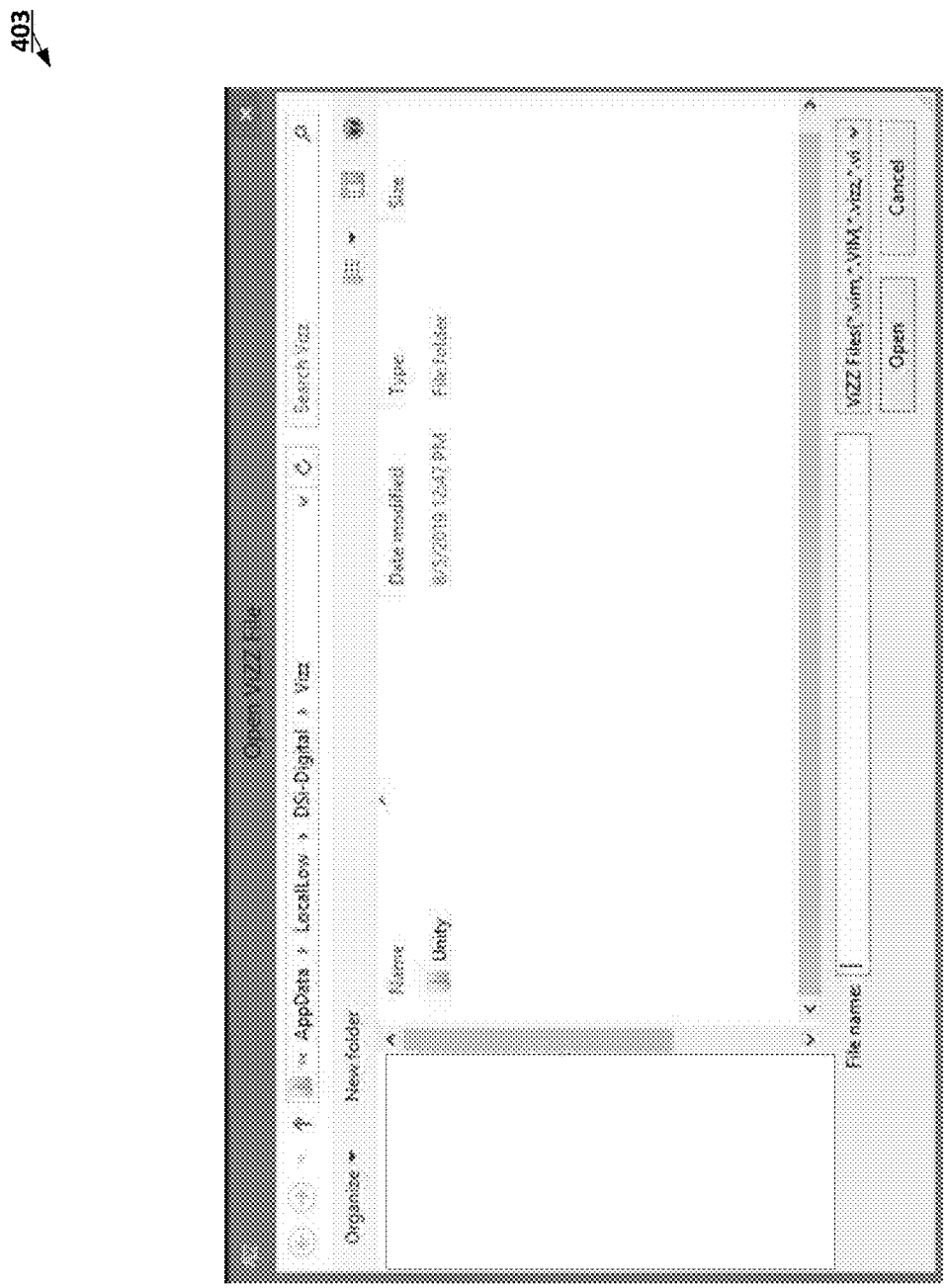

FIG. 12 provides an operational example of a user interface of a file selection user interface for accessing things data objects in accordance with some embodiments discussed herein.

Figure 13:
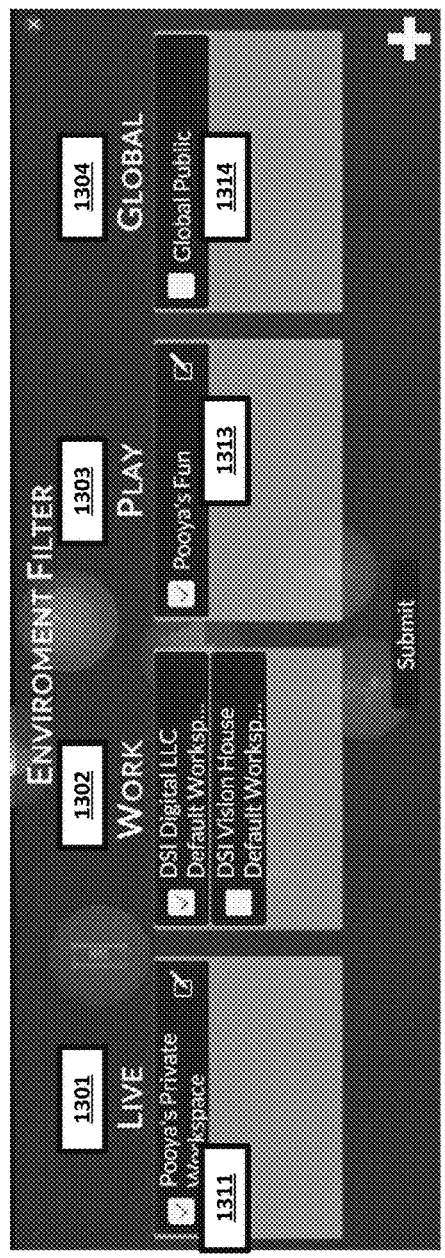

FIG. 13 provides an operational example of a user interface that enables user selection of environment states for a data interaction platform in accordance with some embodiments discussed herein.

Figure 14:
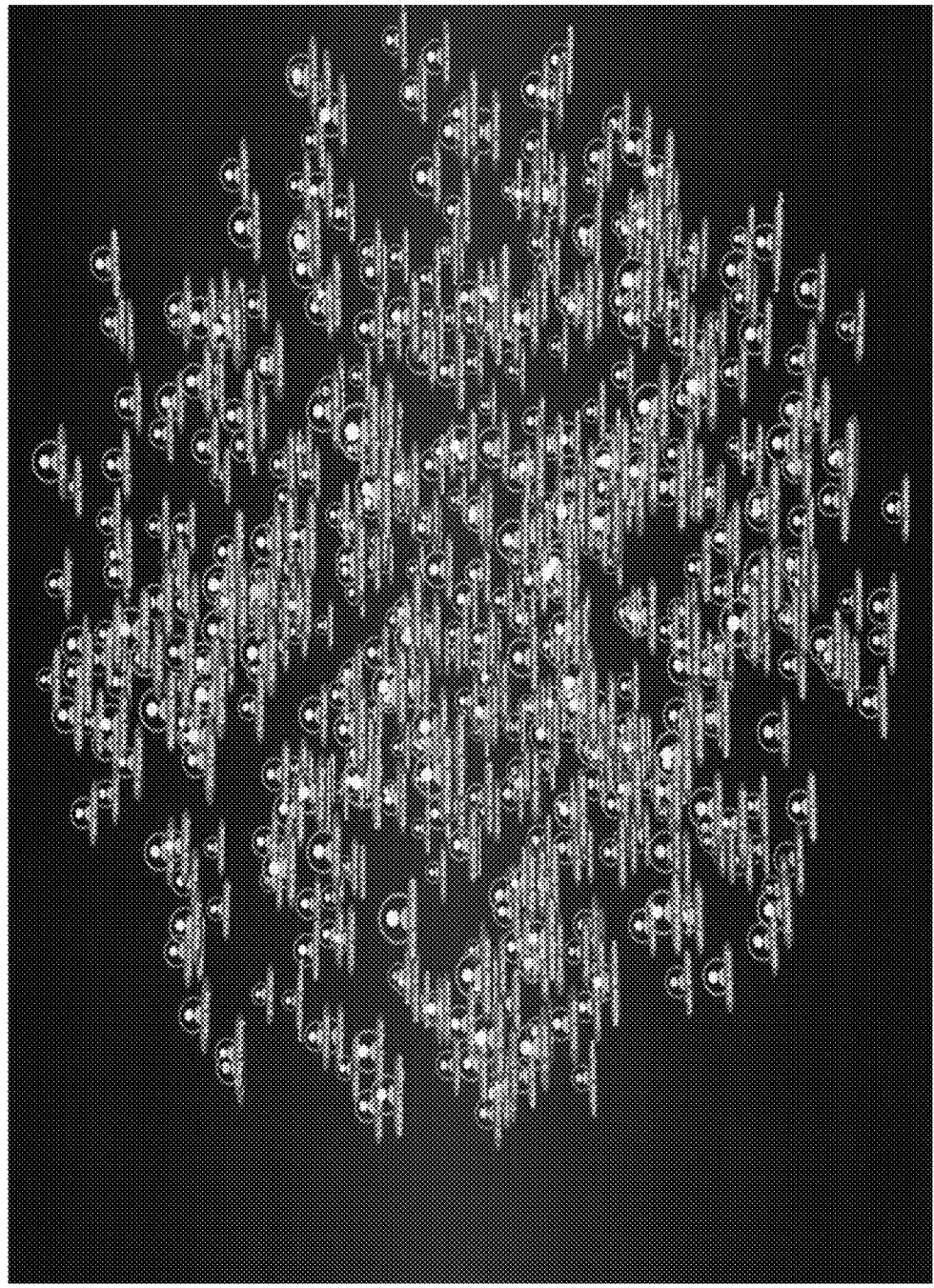

FIG. 14 provides another operational example of a user interface for a multi-object visualization space for various living data objects in accordance with some embodiments discussed herein.

Figure 15:
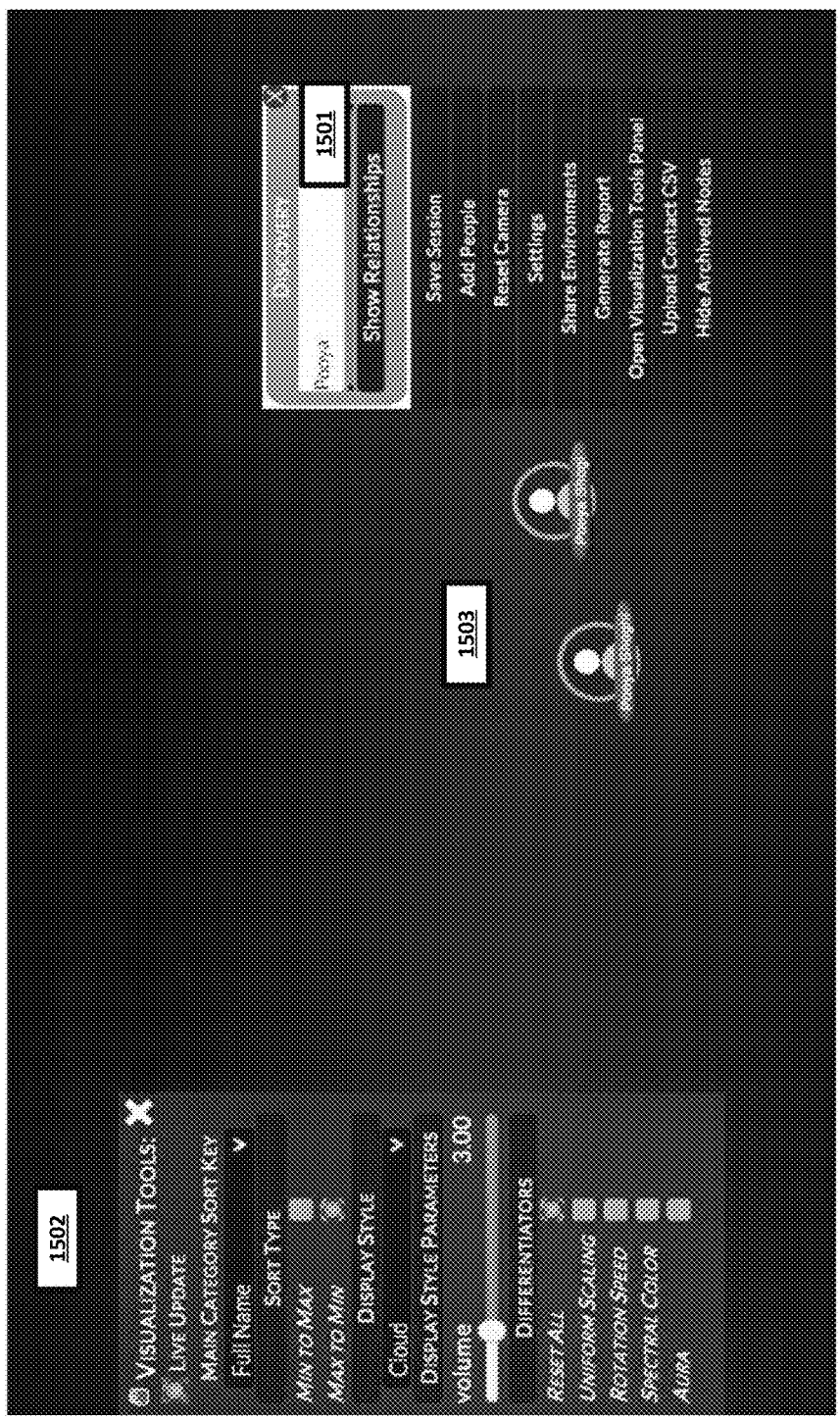

FIG. 15 provides an operational example of a user interface for displaying data object results of a data retrieval query in accordance with some embodiments discussed herein.

Figure 16:
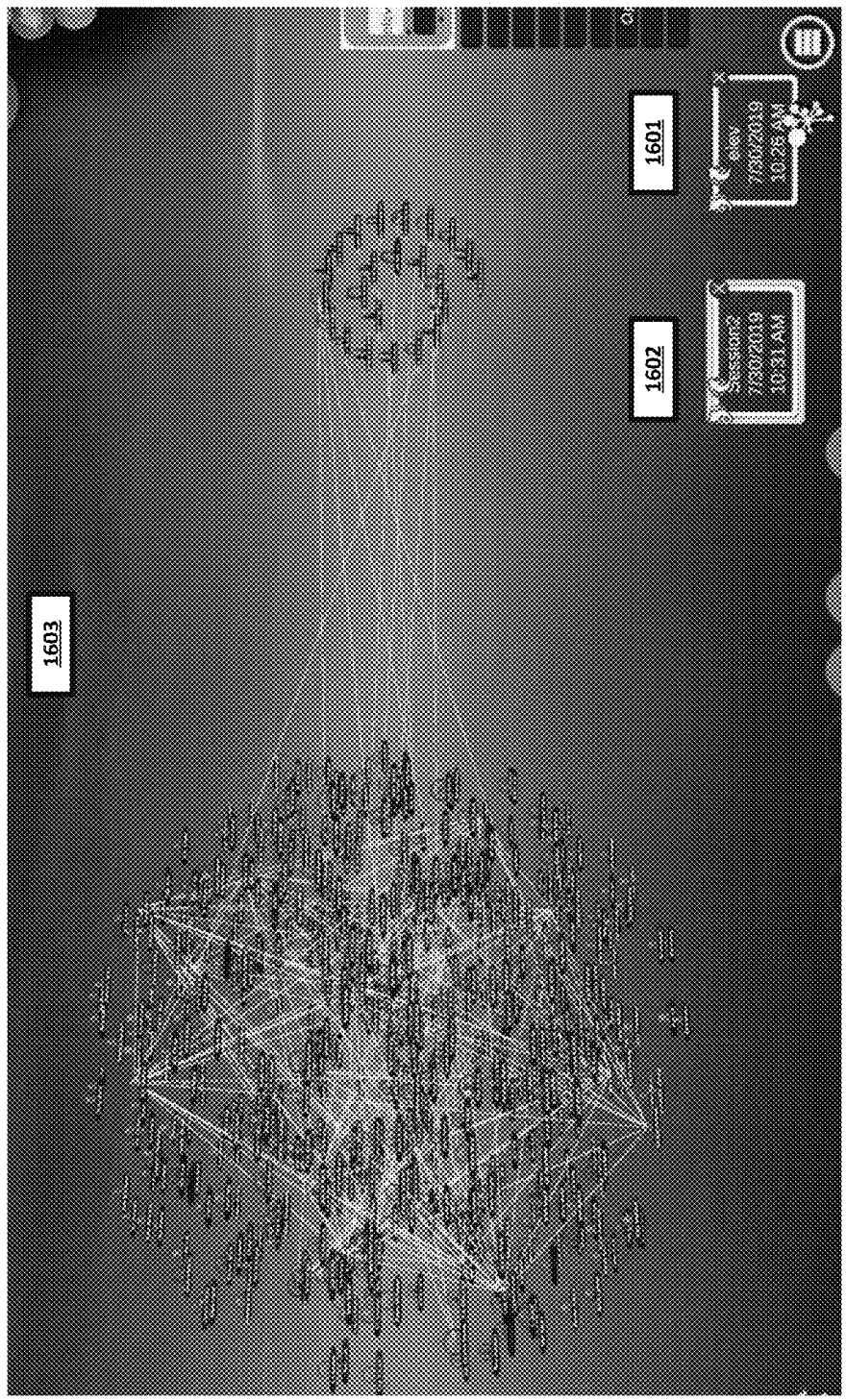

FIG. 16 provides an operational example of a user interface for displaying data object results and data object relationship results of a data retrieval query in accordance with some embodiments discussed herein.

Figure 17:
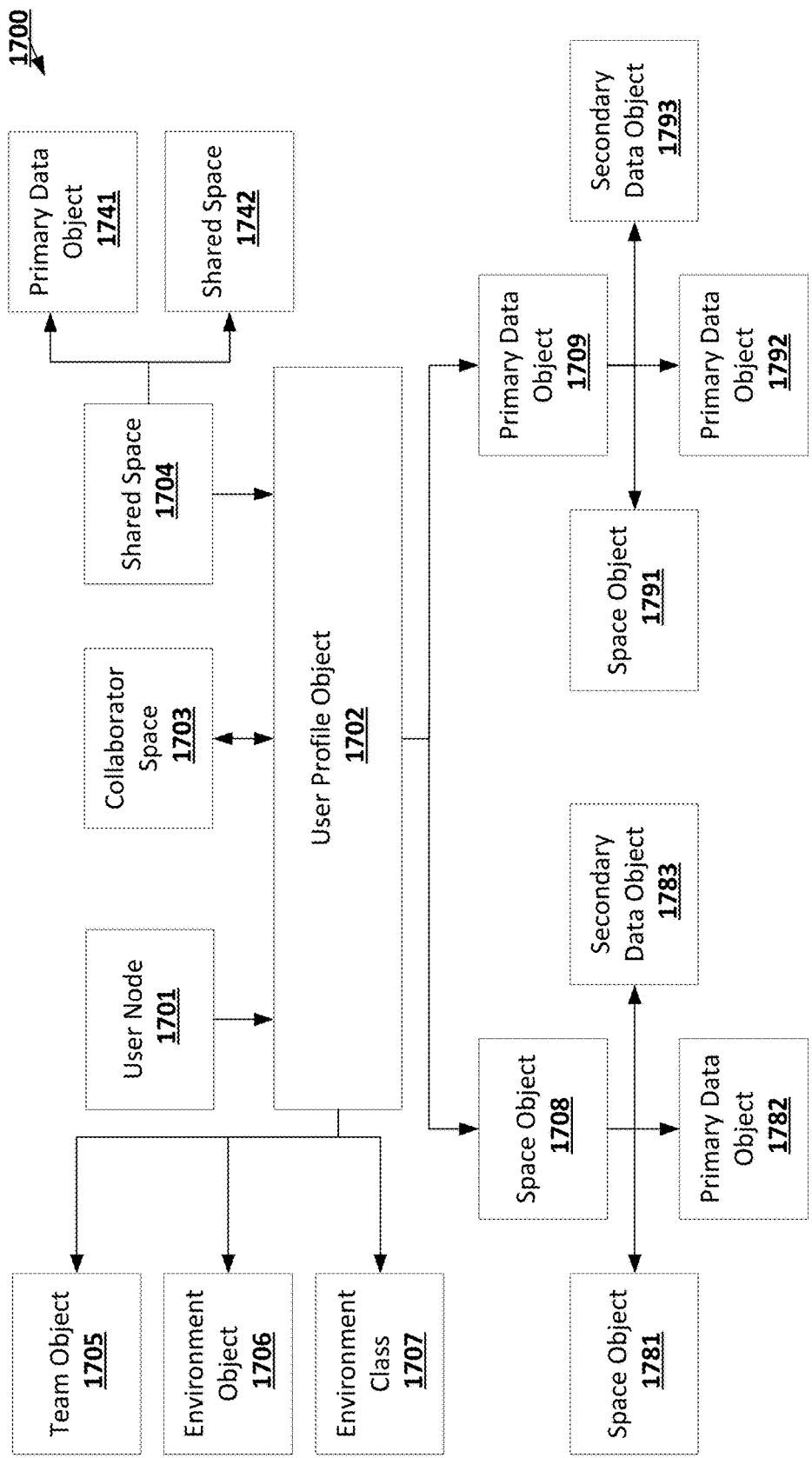

FIG. 17 is a logical data flow diagram for a data interaction system utilizing dynamic relational awareness in accordance with some embodiments discussed herein.

Figure 18:
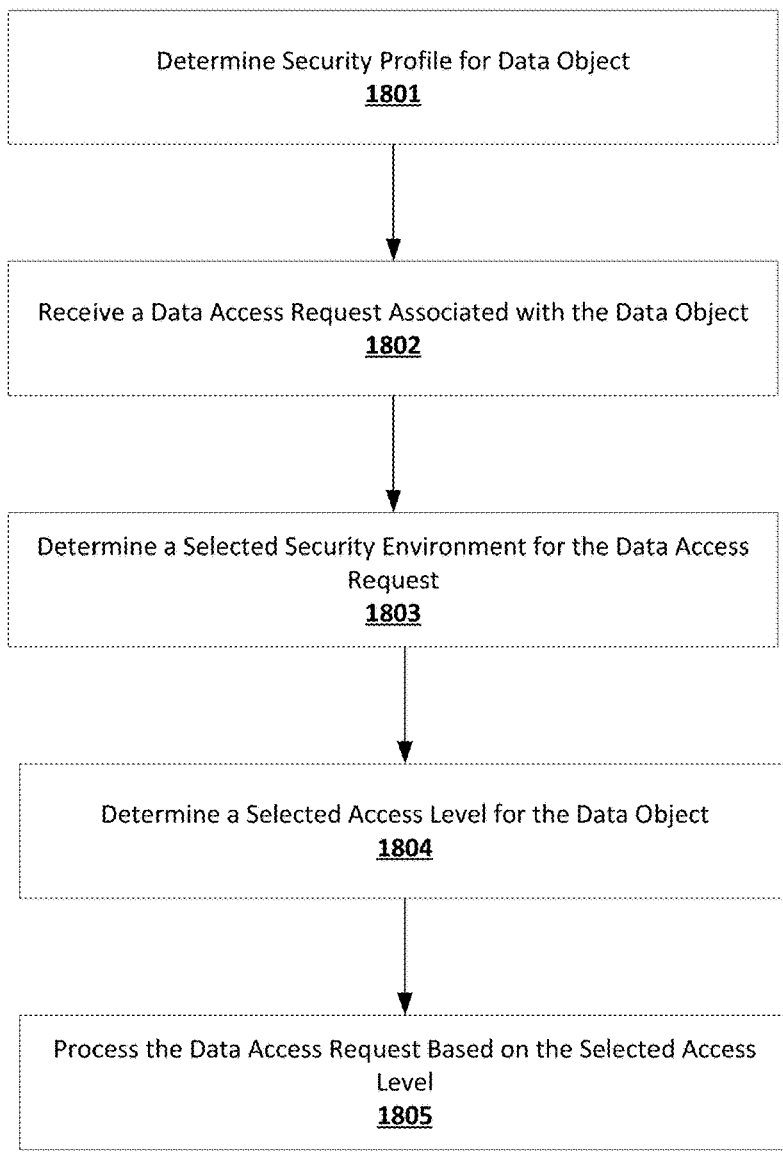

FIG. 18 is a flowchart diagram of an example process for performing dynamic access security enforcement with respect to a data object stored on a data interaction platform computing entity in accordance with some embodiments discussed herein.

Figure 19:
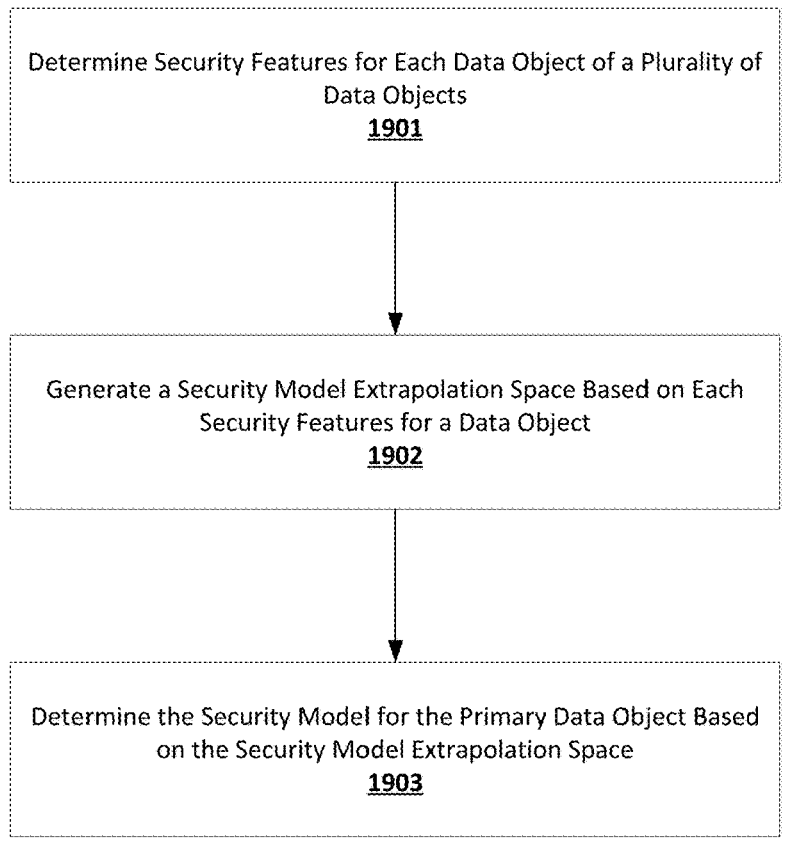

FIG. 19 is a flowchart diagram of an example process for determining a security policy for a data object using a security model extrapolation space in accordance with some embodiments discussed herein.

Figure 20:
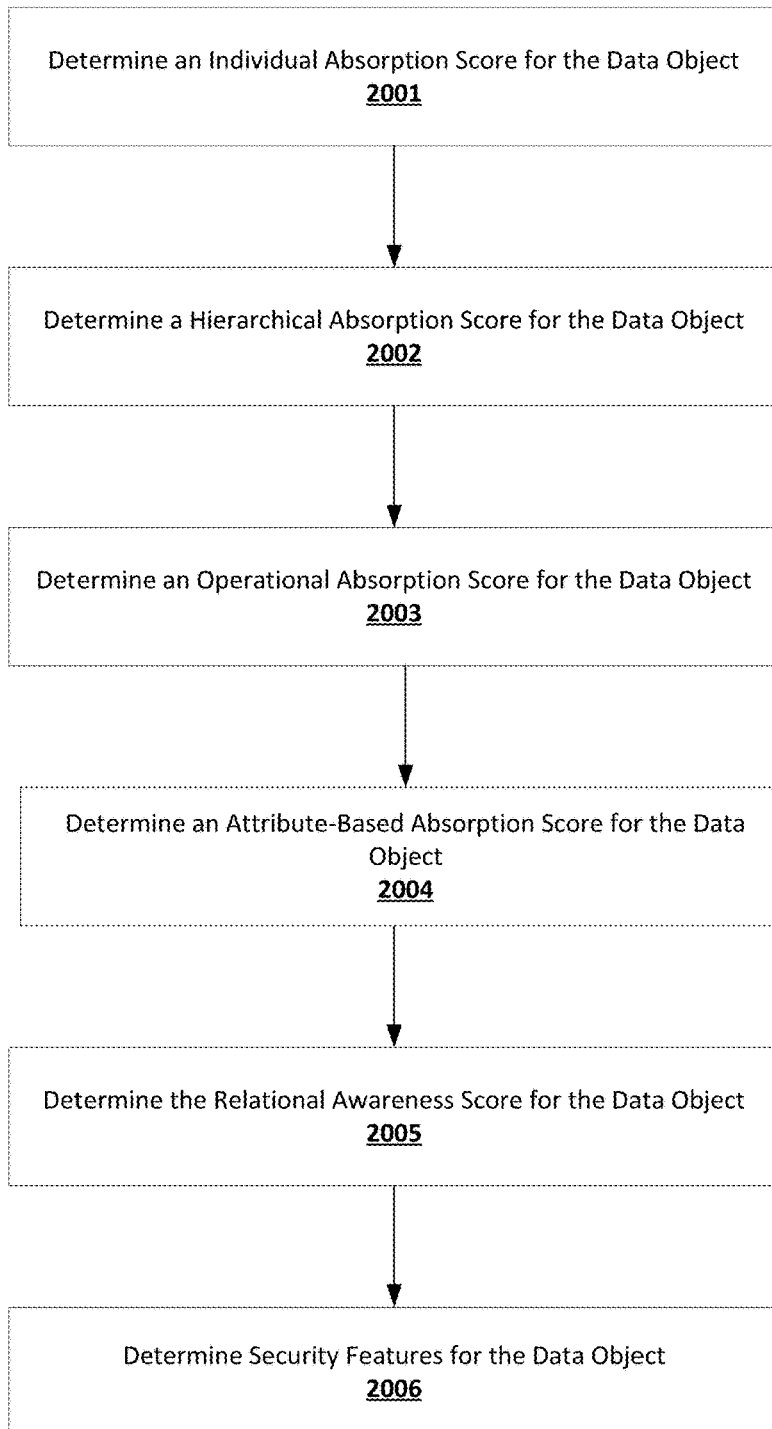

FIG. 20 is a flowchart diagram of an example process for determining security features for a data object in accordance with some embodiments discussed herein.

Figure 21:
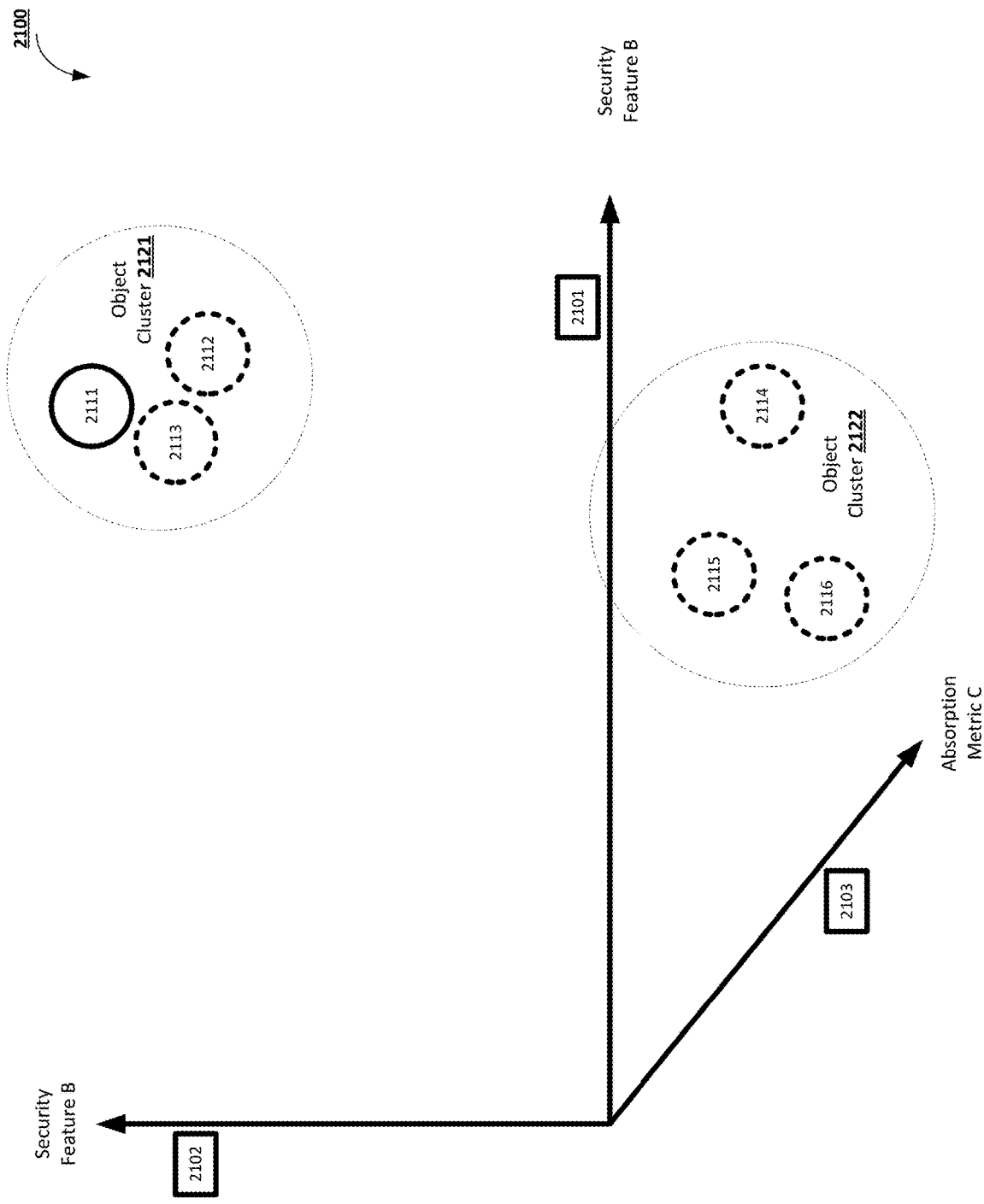

FIG. 21 provides an operational example of a security model extrapolation space in accordance with some embodiments discussed herein.

Figure 22:
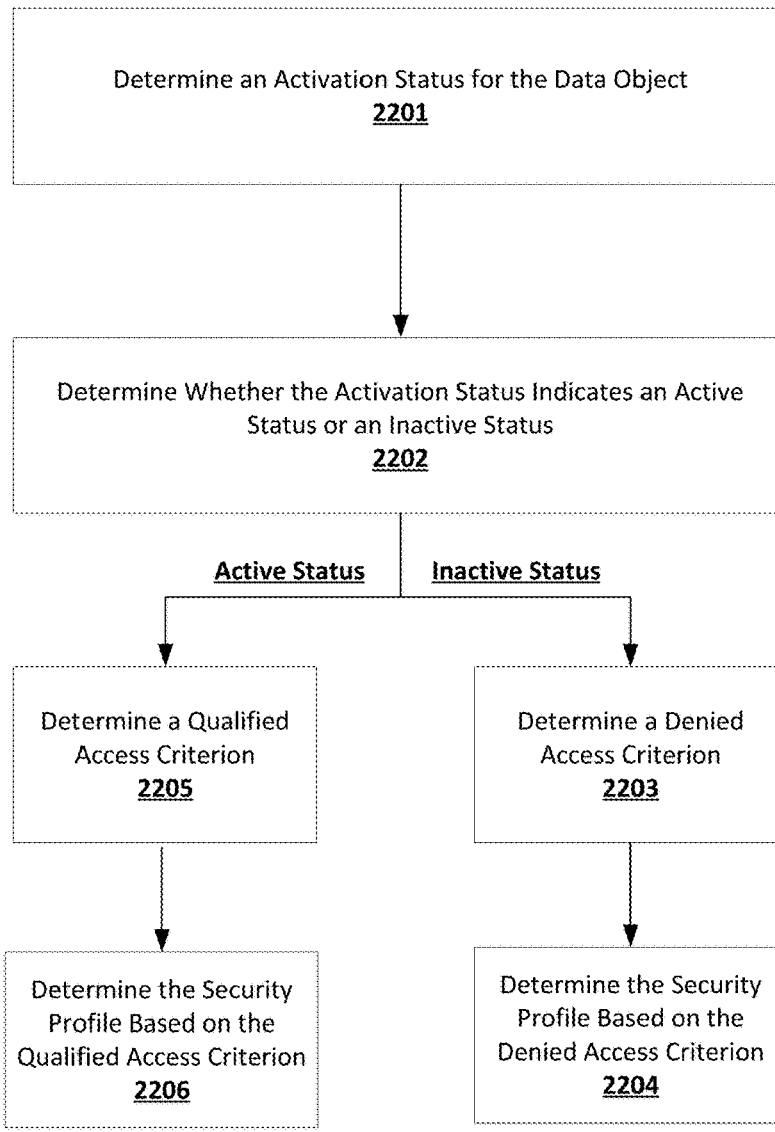

FIG. 22 is a flowchart diagram of an example process for determining a security policy for a data object based on an activation status for the data object in accordance with some embodiments discussed herein.

Figure 23:
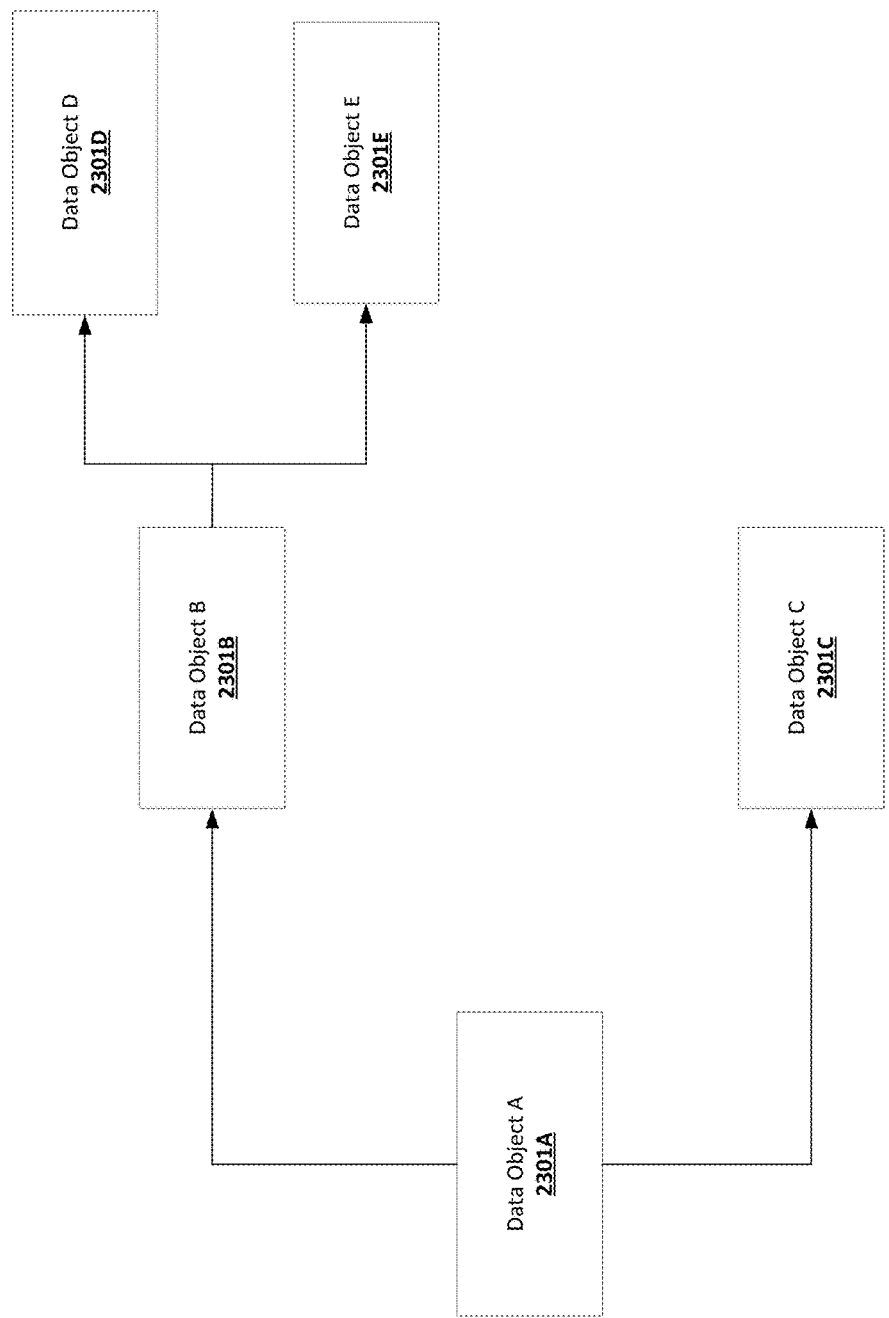

FIG. 23 provides an operational example of a data object hierarchy for a data object in accordance with some embodiments discussed herein.

Figure 24:
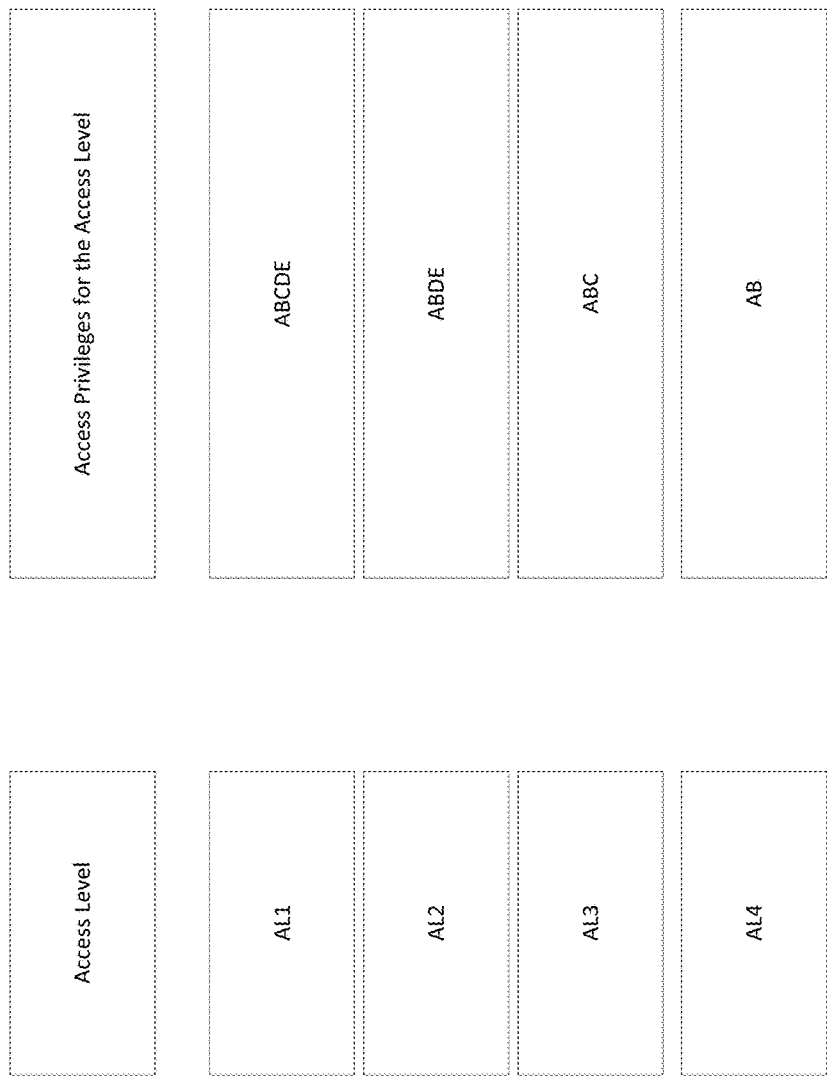

FIG. 24 provides an operational example of access level definition data in accordance with some embodiments discussed herein.

Figure 25:
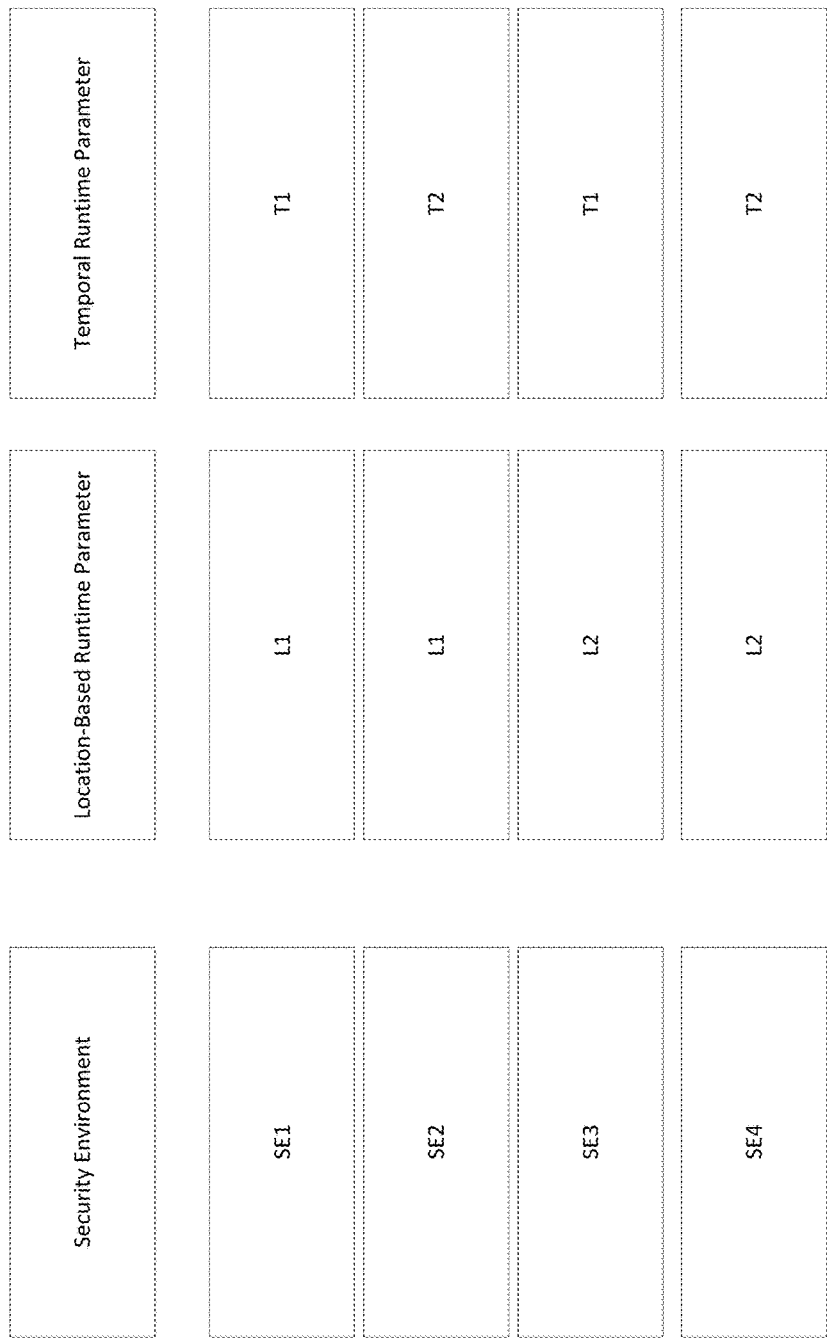

FIG. 25 provides an operational example of security environment definition data in accordance with some embodiments discussed herein.

Figure 26:
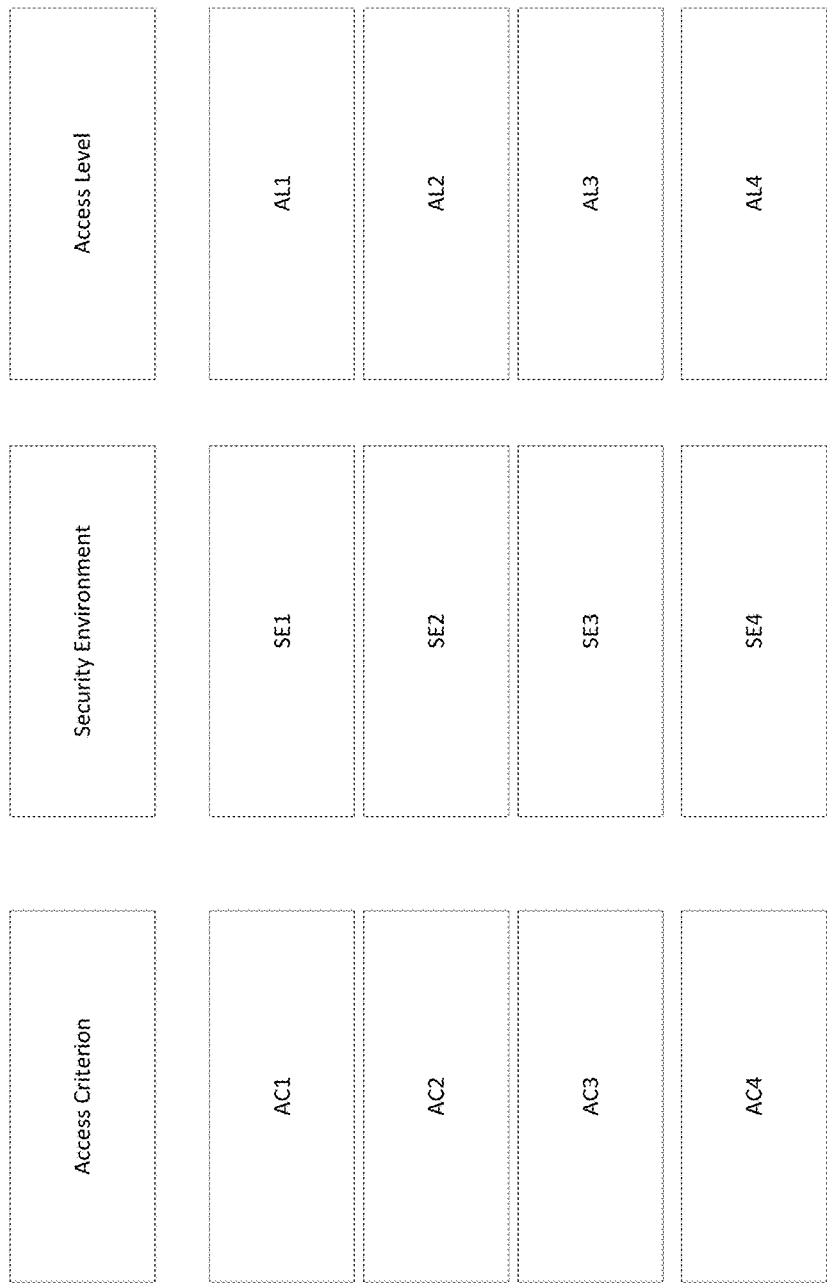

FIG. 26 provides an operational example of security profile definition data in accordance with some embodiments discussed herein.

Figure 27:
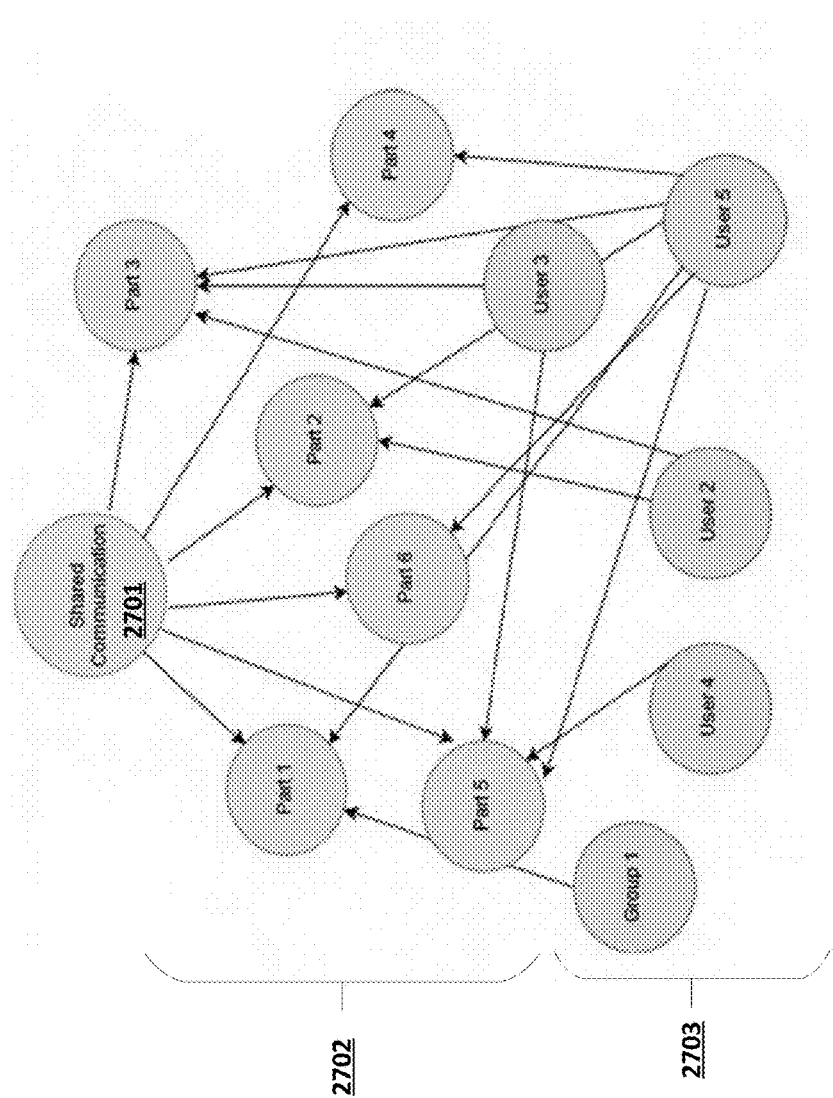

FIG. 27 provides an operational example of cross-user access privilege data in accordance with some embodiments discussed herein.

Figure 28:
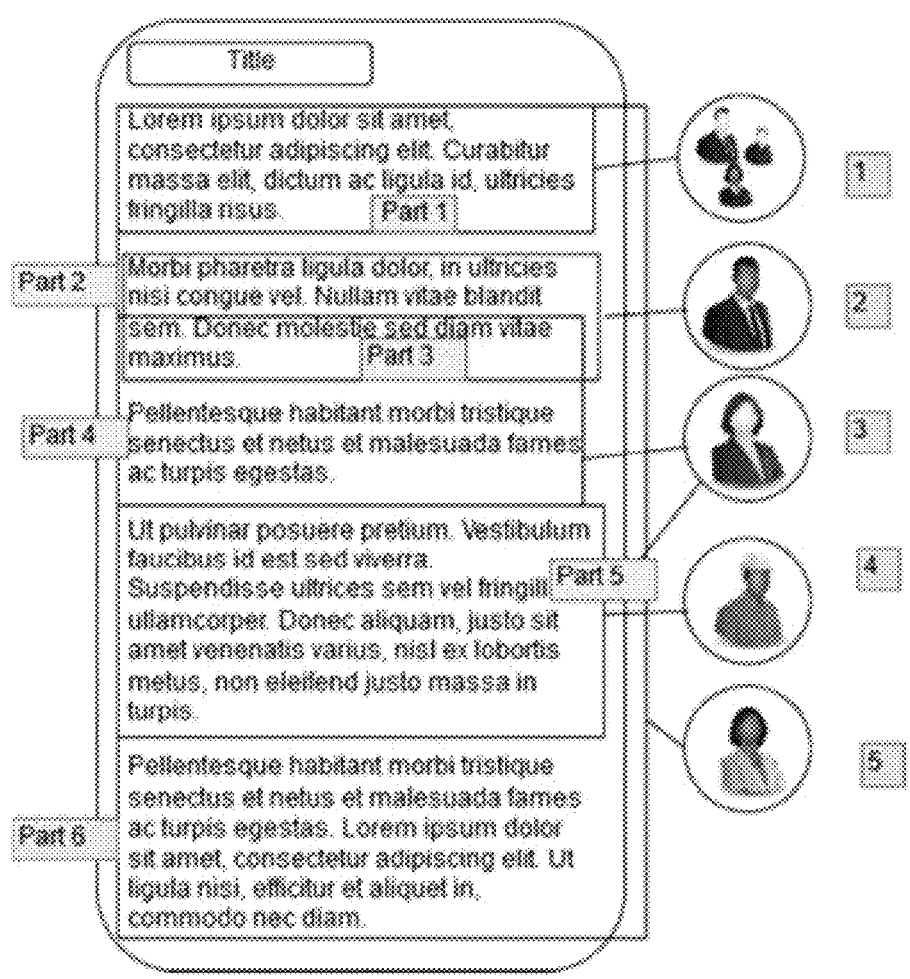

FIG. 28 provides an operational example of a communication partition user interface in accordance with some embodiments discussed herein.

Figure 29:
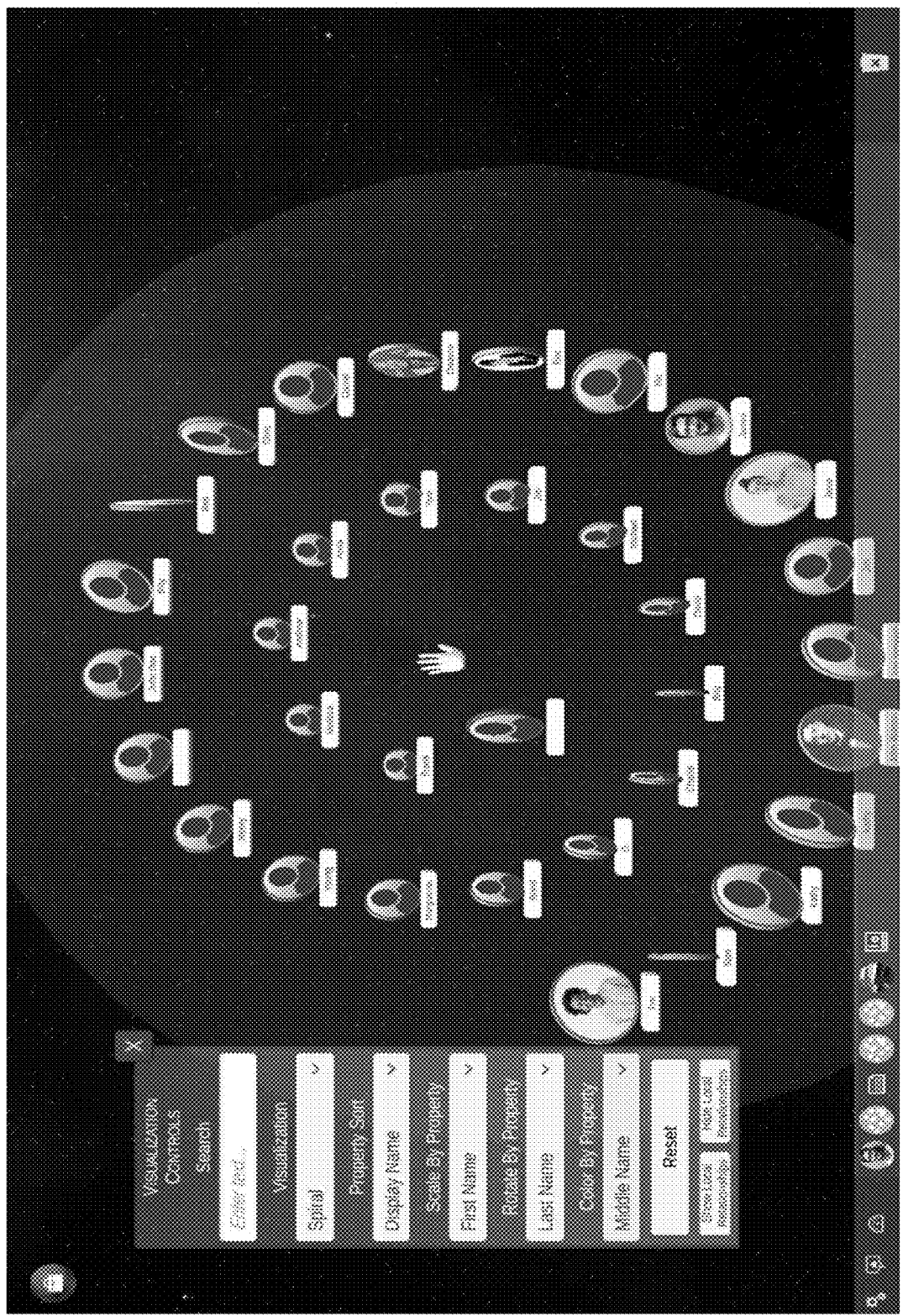

FIG. 29 provides an operational example of another user interface for displaying data object results of a data retrieval query in accordance with some embodiments discussed herein.

Figure 30:
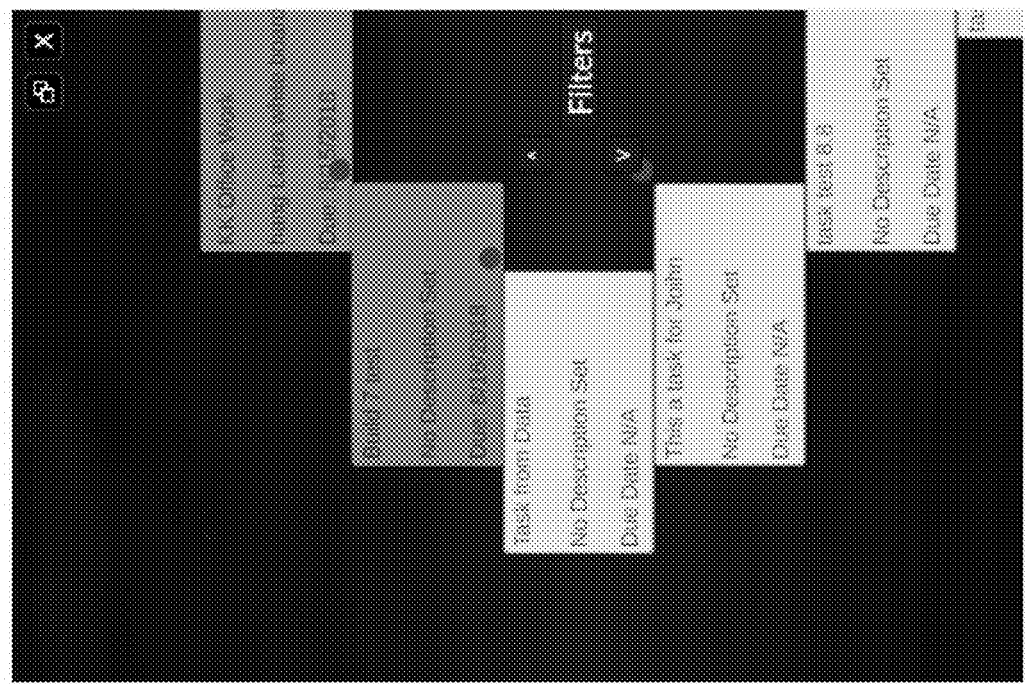

FIG. 30 provides an operational example of another user interface for a multi-object visualization space for various tasks data objects in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address problems associated with reliably enforcing security protocols in data interaction platforms given runtime considerations. Existing data interaction platforms typically define security protocols in static terms. For example, whether and how much can a particular user access particular data is in most cases a function of whether a privileged user has given corresponding access rights to the particular user. Such a rigid and static definition of security parameters ignores the relevance of runtime environmental conditions in defining and maintaining security protocols. For example, an administrator user profile may need to take into account location-based or temporal considerations in enabling or disabling access to particular data by a particular user profile. As another example, an administrator user profile may need to take into account dynamic and temporally-adjusted relational awareness scores between data associated with a particular user profile and target data in determining whether the particular user profile should be granted access to the particular data. Existing data interaction platforms do not provide mechanism for defining and enforcing such runtime-dynamic security protocols. In this way, the noted existing data interaction platforms fail to provide reliable and appropriately use flexible solutions for enforcing security protocols in data interaction platform.

Various embodiments of the present invention address the noted challenges associated with the reliability of security enforcement in data interaction platform by enabling, defining and adjusting access privileges based on runtime parameters. For example, various embodiments of the present invention enable defining security profiles for data objects that relate access levels associated with the data objects with runtime parameters of data access request sessions. In doing so, various embodiments of the present invention provide efficient and reliable mechanisms for dynamic security enforcement based on run-time parameters that eliminate the hurdles associated with static non-dynamic enforcement solutions employed in various existing data interaction applications. As another example, various embodiments of the present invention enable defining security profiles that limit data gathering from user devices based on runtime parameters associated with the user device, such as jurisdictional runtime parameters associated with the user profiles. In doing so, various embodiments of the present invention provide efficient and reliable mechanisms for defining and maintaining run-time controls on data gathering operations that enhance user privacy and compliance with applicable data privacy regulations.

Moreover, various embodiments of the present invention address technical shortcomings of traditional graph-based databases. For example, various embodiments of the present invention introduce innovative data models that process relationships between data objects not as static associations that are recorded independent of those data objects, but as dynamic associations that are recorded and absorbed by the data objects according to various attributes of those data objects. According to some aspects, a data object has relational awareness scores with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores).

II. DEFINITIONS OF CERTAIN TERMS

The term "security profile" may refer to data that indicate guidelines and rules for accessing the data object given one or more runtime parameters that are dominant at a time associated with a requesting for accessing the data object. In some embodiments, a data object may be associated with a universal security profile that governs rules and guidelines for accessing the data object by any of the user profiles associated with a data interaction platform computing entity. In some embodiments, a data object may be associated with one or more qualified security profiles that each governs rules and guidelines for accessing the data object by a subset of the user profiles associated with a data interaction platform computing entity.

The term "access level" may refer to data that indicate a subset of the data associated with the particular data object, including any empty subset of such data and a subset of the data associated with the particular data object that includes all of the data associated with the particular data object. For example, given a data object that includes data fields F1-F10, a first access level may include data fields F1-F2, a second access level may include data fields F2, F4, and F6, and/or the like.

The term "security environment" may refer to data that indicate one or more runtime parameter value ranges for one or more runtime parameters associated with a data access session by a user profile which may affect the ability of the user profile to access particular data objects. For example, a particular security environment may be defined by at least one of a location-based runtime parameter value indicating a particular geographic area (e.g., a particular geographic area corresponding to a particular office of a particular company), a temporal runtime parameter value indicating a particular range of time within a week (e.g., every weekday between 9 AM and 5 PM), a network connection-based runtime parameter indicating a particular network connection used to connect to the data interaction platform computing entity (e.g., a particular virtual private network (VPN) associated with a company), an environment-selection runtime parameter indicating an environment state selected by a user of the data interaction platform computing entity 106 (e.g., an environment state associated with work or leisure), a jurisdictional runtime parameter indicating a legal and/or regulatory jurisdiction of a user profile associated with the data access request, and/or the like.

The term "security feature" may refer to data that indicate any property of the data object that can be used to extrapolate the security profile of the data object. In some embodiments, at least some of the security features of a data object are determined based on features of the data object used to model the data object in a data modeling framework. For example, at least some of the security features of a data object may be determined based on absorption scores and/or relational awareness scores associated with a data object. As another example, at least some of the security features of a data object may be determined based on a hierarchical position of a data object vis-à-vis other data objects within a hierarchical data object scheme. As yet another example, at least some of the security features of a data object may be determined based on a relational position of a data object vis-à-vis other data objects within a relational data object scheme. As a further example, at least some of the security features of a data object may be determined based on a position of a data object within an object graph in a graph-based data modeling scheme.

The term "runtime parameter" may refer to data that indicate any property of a request session during which the data access request is generated and/or received. For example, a location-based runtime parameter may describe a location of a request session. As another example, a temporal runtime parameter may describe a time of a request session. As yet another example, a network-connection-based runtime parameter may describe a network connection used to transmit the data access request during the request session. As a further example, an environment-selection runtime parameter may describe a user selected an environment state. In general, a runtime parameter may describe any dynamic property of a data access request that cannot be determined before runtime of a computer-implemented procedure used to generate and transmit the data access request.

The "security model extrapolation space" may refer to data that indicate any mapping of two or more data objects based on at least some of the security features of the two or more data objects. In some embodiments, distances between mappings of the data objects in the security model extrapolation space can be used to infer security profiles for the mapped data objects. For example, the mapped data objects can be divided into one or more object clusters based on the distances between mappings of the mapped data objects using one or more clustering algorithms. In some embodiments, the security profile of a particular data object in a particular cluster may be determined based on the security profiles of at least some of the mapped data objects in the same cluster as the particular data object. As another example, the security profile of a particular data object may be determined based on the security profiles of other mapped objects associated with the security model extrapolation space as well as distances between the mapping of the particular data object and the mappings of the other mapped data objects associated with the security model extrapolation space.

The term "activation status" may refer to data that indicate whether a data object is accessible at all by an associated set of user profiles associated with a data interaction platform computing entity. For example, a particular data object may be inaccessible by lower-level user profiles associated with the data interaction platform computing entity. As another example, a particular data object may be inaccessible by all of the user profiles associated with the data interaction platform computing entity. Examples of inactive data objects may include data objects associated with deceased individuals, former employees, past events, completed projects, and/or the like.

The term "individual absorption score" may refer to data that indicate an estimated relational awareness tendency of a particular data object given one or more individual attributes of the particular data object. For example, based at least in part on an example model for inferring individual absorption scores, a data object associated with a particular individual person having a high educational degree may be deemed to have a high absorption score. As another example, based at least in part on another example model for generating individual absorption scores, a data object associated with a particular individual person having a particular physical profile (e.g., age, height, weight, and/or the like) may be deemed to have a high absorption score.

The term "hierarchical absorption score" may refer to data that indicate an estimated relational awareness tendency of a particular data object given one or more individual attributes of a parent data object of the particular data object. In some embodiments, the hierarchical absorption score for the data object is determined based at least in part on each individual absorption score for a parent data object that is a hierarchical parent of the data object. In some embodiments, the one or more parent data objects for a particular data object include a hierarchical meta-type of the particular data object, where the hierarchical meta-type of the particular data object indicates whether the particular data object is comprising one or more related hierarchical meta-type designations of a plurality of predefined hierarchical meta-type designations. In some embodiments, the plurality of predefined hierarchical meta-type designations include: a first predefined hierarchical meta-type designation associated with living real-world entities, a second predefined hierarchical meta-type designation associated with non-living-object real-world entities, a third predefined hierarchical meta-type designation associated with location-defining real-world entities, a fourth predefined hierarchical meta-type designation associated with time-defining real-world entities, a fifth predefined hierarchical meta-type designation associated with communication-defining entities, a sixth predefined hierarchical meta-type designation associated with group-defining entities, and a seventh predefined hierarchical meta-type designation associated with knowledge-defining entities.

The term "operational absorption score" may refer to data that indicate an estimated relational awareness tendency of a particular data object given one or more individual attributes of at least one data object that is deemed to be operationally related to (e.g., have a sufficiently strong relationship with) the particular data object. In some embodiments, the operational absorption score for the data object is determined based at least in part on each individual absorption score for a related data object that is operationally related to the particular data object. In some embodiments, a related data object is deemed related to a particular data object if there is a non-hierarchical relationship between the two data objects. In some embodiments, the one or more related data objects for a particular data object of include one or more user-defining objects associated with the particular data object and one or more access-defining data objects associated with the particular data object. In some embodiments, the one or more user-defining objects associated with the particular data object include one or more primary user-defining objects associated with the particular data object and one or more collaborator user-defining objects associated with the particular data object. In some embodiments, the one or more access-defining data objects associated with the particular data object include one or more sharing space data objects associated with the particular data object (e.g., a public sharing space data object, a collaborator space object, a shared space object, and/or the like).

The term "environment state" may refer to data that indicate an inferred user purpose and/or an indicated user purpose behind usage of a software environment such as a data interaction platform at a particular time. Environment states may be generated based at least in part on user-supplied information and/or by performing machine learning analysis of the usages of data at different time intervals and/or in different locations. For example, a data interaction platform computing entity may infer based at least in part on user interaction data that the user uses separate groups of data objects at different time intervals and thus conclude that the separate groups of data objects belong to different environments. Moreover, selection of one or more environment states for a particular usage session may be performed based at least in part on explicit user selection and/or based at least in part on detecting that the user is at a time-of-day and/or at a location associated with a particular environment state. For example, a data interaction platform computing entity may infer a "working" environment state for a particular usage session by a user during working hours and/or while the user is located at a geographic location of the user's office. As further discussed below, an innovative aspect of the present invention relates to utilizing relational awareness signals provided by the environment states for usage of a data interaction platform to generate relational awareness scores for particular data objects. In some embodiments, the environment state of a data interaction platform is selected from a plurality of candidate environment states of the data interaction platform. In some of those embodiments, the plurality of candidate environment states of the data interaction platform indicates at least one of the following: one or more private environment states, one or more professional environment states, one or more leisure environment state, and one or more public environment states.

The term "relational awareness score" may refer to data that indicate an estimated and/or predicted significance of a relationship associated with a particular data object to modeling real-world and/or virtual relationships of the particular data object which a data model seeks to model. In some embodiments, relational awareness score for a relationship indicates an estimated and/or predicted priority of a relationship associated with a particular data object when performing data retrieval and/or data search of data associated with the particular data object. According to some aspects of the present invention, a data object has relational awareness score with respect to each of its associated data object relationships. This allows the data object to have an independent recognition of various data object relationships, including data object relationships that are typically modeled indirect data object relationships in traditional graph models, while being able to distinguish between more significant data object relationships (e.g., data object relationships having higher respective relational awareness scores) and less significant data object relationships (e.g., data object relationships having lower respective relational awareness scores).

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for dynamic security enforcement with respect to a data interaction platform. The architecture 100 includes one or more client computing entities 102 and a data interaction platform computing entity 106. The data interaction platform computing entity 106 may be configured to communicate with at least one of the client computing entities 102 over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). While not depicted in FIG. 1, the data interaction platform computing entity 106 may retrieve input data from one or more external computing entities, such as one or more external information server computing entities.

A client computing entity 102 may be configured to provide data access requests to the data interaction platform computing entity 106. The data interaction platform computing entity 106 may be configured to process the data access requests and provide corresponding outputs to the client computing entity 102. The data interaction platform computing entity 106 includes a security profile determination engine 111, a request processing engine 112, and a security profile enforcement engine 113. The security profile determination engine 111 is configured to determine security profiles for data objects. The request processing engine 112 is configured to obtain data access requests from the client computing entities 102, determine security environments associated with the data access requests, and provide outputs corresponding to the data access requests to the client computing entities 102. The security profile enforcement engine 113 is configured to select access levels for data access requests based on the security profiles for data objects and the security environments for data access requests as well as enforce the selected access levels.

The storage subsystem 108 may be configured to store target data, security profiles, and security environments. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Data Interaction Platform Computing Entity

FIG. 2 provides a schematic of a data interaction platform computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data interaction platform computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. In some embodiments, the data interaction platform computing entity 106 may be configured to perform one or more edge computing capabilities.

As shown in FIG. 2, in one embodiment, the data interaction platform computing entity 106 may include or be in communication with one or more processing elements 205 (also referred to as processors, processing circuitry, and/or similar terms used herein interchangeably) that communicate with other elements within the data interaction platform computing entity 106 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIP s), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data interaction platform computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data interaction platform computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data interaction platform computing entity 106 with the assistance of the processing element 205 and operating system.

As indicated, in one embodiment, the data interaction platform computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data interaction platform computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data interaction platform computing entity 106 may include or be in communication with one or more input elements, such as a keyboard input, a mouse input, a touch screen/display input, motion input, movement input, audio input, pointing device input, joystick input, keypad input, and/or the like. The data interaction platform computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the data interaction platform computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the data interaction platform computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the data interaction platform computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the data interaction platform computing entity 106 and/or various other computing entities.

In another embodiment, the client computing entity 102 may include one or more components or functionality that are the same or similar to those of the data interaction platform computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention address the challenges associated with the reliability of security enforcement in data interaction platform by enabling defining and adjusting access privileges based on runtime parameters. For example, various embodiments of the present invention enable defining security profiles for data objects that relate access levels associated with portions of the data objects with security environments defined based on runtime parameters. In doing so, various embodiments of the present invention provide efficient and reliable mechanisms for run-time dynamic security enforcement in data interaction applications that eliminate the hurdles associated with static security enforcement solutions employed in various existing data interaction applications. As another example, various embodiments of the present invention enable defining security profiles that limit data gathering from user devices based on runtime parameters associated with the user device, such as jurisdictional runtime parameters associated with the user profiles. In doing so, various embodiments of the present invention provide efficient and reliable mechanisms for defining and maintaining run-time controls on data gathering operations that enhance user privacy and compliance with applicable data privacy regulations.

Exemplary Data Interaction Platform

FIG. 4 provides an operational example of a user interface 400 for a data interaction platform that may be generated by the data interaction platform computing entity 106 and that may utilize at least some of the dynamic relational awareness concepts, the data visualization concepts, and the external integration concepts discussed in the present document. The user interface 400 includes user interface elements 401-408 as well as user interface element 410. The user interface elements 401-408 each correspond to a hierarchical meta-type designation characterizing root nodes of a hierarchical dependency structure between data objects utilized by the data interaction platform. As further described below, the data interaction platform maintains a hierarchy of data objects, where each child data object hierarchically depends from one or more parent data objects. For example, a data object corresponding to a particular person who is an employee of a particular company and a graduate of a particular university may be a hierarchical dependent of a data object associated with employees of the particular company and a data object associated with graduates of the particular university. The data object associated with the employees of the particular company may in turn be a hierarchical dependent of a data object associated with working adults, while the data object associated with graduates of the particular university may in turn be a hierarchical dependent of a data object associated with university graduates. As further discussed below, an innovative aspect of the present invention relates to utilizing relational awareness signals provided at each level of a hierarchical dependency structure between data objects (e.g., absorption scores of each parent data object for a particular data object) to generate relational awareness scores for particular data objects.

In some embodiments, the hierarchical dependency structure relates each data object to at least one of various preconfigured hierarchical meta-type designations, where each hierarchical meta-type designation may relate to foundational properties of the data object that give a universal meaning to its relationship with other data objects. As described above, the preconfigured hierarchical meta-type designations may server as root nodes of a hierarchical dependency structure between data objects utilized by the data interaction platform. Various approaches may be adapted to define such preconfigured hierarchical meta-type designations, where each approach may utilize different foundational properties of data objects to define preconfigured hierarchical meta-type designations and/or maintain different levels of granularity for defining preconfigured hierarchical meta-type designations. In the exemplary approach depicted in the user interface 400 of FIG. 4, the preconfigured hierarchical meta-type designations are defined based on primary and potentially secondary characteristics/classifications to include a "living" designation associated with the user interface element 401, a "places" designation associated with the user interface element 402, a "things" designation associated with the user interface element 403, a "time" designation associated with the user interface element 404, an "actions" designation associated with the user interface element 405, a "communications" designation associated with the user interface element 406, a "groupings" designation associated with the user interface element 407, and a "knowledge" designation associated with the user interface element 408. However, a person of ordinary skill in the relevant technology will recognize that other formulations of the various preconfigured hierarchical meta-type designations are feasible and may confer particular advantages in various implementations and use cases.

Depending on system semantics, the "living" hierarchical meta-type designation may relate to data objects describing people, contacts, animals, plants, and/or the like. An operational example of a user interface depicting visual relationships of particular "living" data objects that may be generated in response to user selection of user interface element 401 is presented in FIG. 5. The user interface depicted in FIG. 5 includes a visualization of various target "living" data objects, such as the "living" data object corresponding to the individual named "Pooya Shoghi," whose visual representation is depicted using the user interface element 501 in the user interface of FIG. 5. As depicted in the user interface of FIG. 6, a user selection of the user interface element 501 depicts data objects that are related to the selected "living" data object, where the data objects are in turn organized by the preconfigured hierarchical meta-type designations discussed above in relation to user interface elements 401-408, here associated with the user interface elements 601-608 respectively. The user interface depicted in FIG. 5 further enables adding new data objects that are related to the selected "living" data object by selecting a designation for a new data object via the user interface element 610 and selecting the user interface element 611, which in turn leads to display of the user interface depicted in FIG. 7, which includes a form for entering attributes of the new data object (such as a company name attribute name that can be entered using user interface element 701, a company industry sector attribute name that can be entered using user interface element 702, and company address attributes that can be entered using user interface elements 703).

Depending on system semantics, the "places" hierarchical meta-type designation may relate to data objects describing locations, cities, regions, countries, continents, and/or the like. A "places" data object may have relationships with data objects of other hierarchical meta-type designations. For example, a "places" data object may have a "was born in" relationship with a "living" data object. As another example, a "places" data object may have a "will be performed in" relationship with an "action" data object. As yet another example, a "places" data object may have a "is located in" relationship with a "things" data object. As a further example, a "places" data object may have "occurred in" relationship with a "communications" data object.

Depending on system semantics, the "things" hierarchical meta-type designation may relate to data objects describing buildings, products, inanimate objects, equipment, inventory, and/or the like. A "things" data object may have relationships with data objects of other hierarchical meta-type designations. For example, a "things" data object may have a "purchased" relationship with a "living" data object. As another example, a "things" data object may have a "is generated using" relationship with an "action" data object. As yet another example, a "things" data object may have a "is located in" relationship with a "places" data object. As a further example, a "things" data object may have "was a subject of" relationship with a "communications" data object. In some embodiments, the "things" data objects may be selected via files of preconfigured formats which are configured to generate visualizations of the noted "things" data objects, for example a file that describe a visualization of a building or a product using relational awareness modeling data associated with the building or the product. FIG. 12 provides an operational example of a file selection user interface that may be generated in response to user selection of user interface element 403 in order to enable a user to select a file with a preconfigured format that describe a visualization of a "things" data object.

Depending on system semantics, a "time" hierarchical meta-type designation may relate to data objects describing seconds, minutes, hours, dates, and/or the like. A "time" data object may have relationships with data objects of other hierarchical meta-type designations. For example, a "time" data object may have a "was born on" relationship with a "living" data object. As another example, a "time" data object may have a "will be performed on" relationship with an "action" data object. As yet another example, a "time" data object may have a "was purchased on" relationship with a "things" data object. As a further example, a "time" data object may have "occurred on" relationship with a "communications" data object. In some embodiments, a time data object may be a category of particular events. In some embodiments, a time data object may be used in linear and non-linear manners and may be deemed related to an action data object. A time data object may also be used to describe "active" and "inactive" statuses, such as a person being considered "active" during periods that fall within their life span and inactive after their period of death.

Depending on system semantics, an "actions" hierarchical meta-type designation may relate to data objects describing events, tasks, projects, performances, concerts, and/or the like. An "actions" data object may have relationships with data objects of other hierarchical meta-type designations. For example, an "actions" data object may have a "was performed by" relationship with a "living" data object. As another example, an "actions" data object may have a "will be performed on" relationship with a "time" data object. As yet another example, an "actions" data object may have a "can be performed by" relationship with a "things" data object. As a further example, an "actions" data object may have "was processed using" relationship with a "communications" data object. In some embodiments, the "actions" hierarchical meta-type designation may have two child data objects, a "tasks" child data object and a "projects" child data object. FIG. 9 provides an operational example of a user interface that may be generated in response to user interface of user interface element 405 associated with the "actions" hierarchical meta-type designation (a second operational example is presented in FIG. 30). As depicted in FIG. 9, the depicted user interface includes user interface elements 901-902, which correspond to the "tasks" data object and "projects" data object respectively. As further depicted in the user interface of FIG. 10, selection of the user interface element 901 associated with the "tasks" data object relates to depicting various target data objects depending from the "tasks" data object, including the "Install ViZZ" data object associated with the user interface element 901. As further depicted in the user interface of FIG. 11, selection of user interface element 901 data objects that are related to the selected "tasks" data object, where the data objects are in turn organized by the preconfigured hierarchical meta-type designations discussed above in relation to user interface elements 401-408.

Depending on system semantics, the "communications" hierarchical meta-type designation may relate to data objects describing emails, phone calls, text messages, pager messages, meetings, and/or the like. A "communications" data object may have relationships with data objects of other hierarchical meta-type designations. For example, a "communications" data object may have a "was received by" relationship with a "living" data object. As another example, a "communications" data object may have a "includes guidelines for" relationship with an "action" data object. As yet another example, a "communications" data object may have a "discusses price of" relationship with a "things" data object. As a further example, a "communications" data object may have "occurred in" relationship with a "time" data object.

Depending on system semantics, the "groupings" hierarchical meta-type designation may relate to data objects describing companies, teams, organizations, email lists, and/or the like. A "groupings" data object may have relationships with data objects of other hierarchical meta-type designations. For example, a "groupings" data object may have a "is a participant in" relationship with a "living" data object. As another example, a "groupings" data object may have a "is expected to perform" relationship with an "action" data object. As yet another example, a "groupings" data object may have a "is owner of" relationship with a "things" data object. As a further example, a "groupings" data object may have "was formed in" relationship with a "time" data object. In some embodiments, a groupings data object may signify a relationship between the data objects in each group, for example a collection of people may be represented by a group data object of a company, thereby creating a relationship, via that company, of those contacts.

Depending on system semantics, the "knowledge" hierarchical meta-type designation may relate to data objects describing files, documents, books, articles, and/or the like. A "knowledge" data object may have relationships with data objects of other hierarchical meta-type designations. For example, a "knowledge" data object may have a "is authored by" relationship with a "living" data object. As another example, a "knowledge" data object may have a "describes how to perform" relationship with an "action" data object. As yet another example, a "knowledge" data object may have a "includes information about" relationship with a "things" data object. As a further example, a "knowledge"

data object may have "was authored in" relationship with a "time" data object. In some embodiments, the "knowledge" hierarchical meta-type designation may have two child data objects, a "files" child data object and a "documents" child data object. FIG. 11 provides an operational example of a user interface that may be generated in response to user interface of user interface element 408 associated with the "knowledge" hierarchical meta-type designation. As depicted in FIG. 11, the depicted user interface includes user interface elements 1101-1102, which correspond to the "files" data object and the "documents" data object respectively. A knowledge data object may also have "is related to" information within the same characteristic class of knowledge items to other information on the same subject matter Returning to FIG. 4, the user interface 400 further includes the user interface element 410 which enables user selection of one or more environment states for the data interaction platform. An environment state of a data interaction platform may indicate an inferred user purpose and/or an indicated user purpose behind usage of the data interaction platform at a particular time. Environment states may be generated based at least in part on user-supplied information and/or by performing machine learning analysis of the usages of data at different time intervals and/or in different locations. For example, the data interaction platform computing entity 106 may infer based at least in part on user interaction data that the user uses separate groups of data objects at different time intervals and thus conclude that the separate groups of data objects belong to different environments. Moreover, selection of one or more environment states for a particular usage session may be performed based at least in part on explicit user selection and/or based at least in part on detecting that the user is at a time-of-day and/or at a location associated with a particular environment state. For example, the data interaction platform computing entity 106 may infer a "working" environment state for a particular usage session by a user during working hours and/or while the user is located at a geographic location of the user's office. As further discussed below, an innovative aspect of the present invention relates to utilizing relational awareness signals provided by the environment states for usage of a data interaction platform to generate relational awareness scores for particular data objects.

FIG. 13 provides an operational example of a user interface that enables user selection of environment states. As depicted in the user interface of FIG. 13, the defined environment states are divided into four meta-type designations: a "live" designation 1301 (e.g., related to private or personal environment states) that includes the environment state "Pooya's Private Workspace" 1311, a "work" designation 1302 (e.g., related to professional environment states), a "play" designation 1303 (e.g., related to entertainment-related or leisure-related environment states) that includes the environment state "Pooya's Fun" 1313, and a "global" designation 1304 (e.g., related to general or public environment states) that includes the environment state "Global Public" 1314. A user can select an environment state by placing a checkmark next to the user interface element associated with the environment state and selecting the submit button. Selection or deselection of environment states can affect visualizations of retrieved data item. For example, as depicted in the user interface of FIG. 14 relative to the user interface of FIG. 5, after selection of the environment state "Global Public" 1314, selection of the user interface element 401 leads to generation and display of a more crowded visualization with a greater number of depicted data objects compared to prior to selection of the environment state "Global Public" 1314. In some embodiments, environments can be utilized to define security parameters for accessing particular data objects and/or particular inter-object relationships.

The example data interaction platform depicted and described herein using FIGS. 4-14 can be utilized to process data retrieval queries and generate responsive query outputs, where a data retrieval query is any request to retrieve one or more data objects that correspond to particular data retrieval query criteria, e.g., one or more filtering criteria, one or more search criteria, and/or the like. For example, FIG. 15 provides an operational example of a user interface 1500 for processing data retrieval queries using the noted data interaction platform (a second operational example is presented in FIG. 29). As depicted in FIG. 15, the user interface 1500 includes user interface elements 1501 for specifying data retrieval query criteria, user interface elements 1502 for specifying visualization parameters defining a desired visualization of data, and user interface elements 1503 depicting search results. As further depicted in the user interface 1600 of FIG. 16, query outputs can be saved as sessions 1601-1602 and visualization results 1603 may include relationships between retrieved data objects. Processing data retrieval queries using a proposed data interaction platform will be described in greater detail below.

To provide the data modeling, data visualization, external integration, and query processing functionalities discussed herein, a data interaction platform utilizing dynamic relational awareness needs to utilize a robust logical data model that enables both relational awareness modeling aspects as well as dynamic user interaction aspects of the noted functionalities. An example of such a logical data model 1700 for a data interaction system is provided in FIG. 17. As depicted in FIG. 17, a user node 1701 is associated with a user profile object 1702, which uniquely identifies the user node 1701 within the data interaction platform, encodes attributes and relationships of the user node 1701 in relation to the data interaction platform, and enables the user node 1701 to interact with other user nodes 1701 within the data interaction platform. The user profile object 1702 manages various data objects, such as a collaboration space 1703 of user profile objects whose access to the data interaction platform is controlled by the user node 1701, a shared space 1704 of data objects that were shared by the user node 1701 with other user profile objects within the data interaction platform and which may include primary data objects such as primary data object 1741 or other shared spaces such as shared space 1742, a team object 1705 that enables the user node 1701 to manage access to its data on a group level, environment objects 1706 each identifying an environment state associated with the user node 1701, and environment classes 1707 each identifying a meta-type designation of environment states associated with the user node 1701.

As further depicted in the logical data model 1700 of FIG. 17, user profile object 1702 owns a space object 1708 which may act as container of multiple data objects and which may include one or more space objects such as space object 1781, one or more primary data objects such as primary data object 1782, and one or more secondary data objects such as secondary data object 1783. Moreover, user profile object 1702 owns a primary data object 1709 which may act as a primary data node and which may include one or more space objects such as space object 1791, one or more primary data objects such as primary data object 1792, and one or more secondary data objects such as secondary data object 1794. In some embodiments, a secondary data object is a data object that is defined by association with another data object such that it will be deleted upon deletion of the other data object. An example of a secondary data object is a phone number data object for an individual person data object. In some embodiments, at least some of the data objects depicted in the logical data model 1700 of FIG. 17 are "default" data objects, meaning that they are automatically created upon creation of a user profile object. In some embodiments, the default data objects include one or more of the team object 1705, the collaborator space 1703, and the shared space 1704.

Dynamic Security Enforcement

FIG. 18 is a flowchart diagram of an example process 1800 for performing dynamic access security enforcement with respect to a data object stored on the data interaction platform computing entity 106. Via the various steps/operations of process 1800, various components of the data interaction platform computing entity 106 can establish and enforce security protocols for data objects in an efficient and effective manner by monitoring runtime environments of data access requests in order to infer security environments associated with the noted data access requests.

The process 1800 begins at step/operation 1801 when the security profile determination engine 111 of the data interaction platform computing entity 106 determines a security profile for the data object. In some embodiments, a security profile for a data object refers to data that indicate guidelines and rules for accessing the data object given one or more runtime parameters that are dominant at a time associated with a requesting for accessing the data object. In some embodiments, a data object may be associated with a universal security profile that governs rules and guidelines for accessing the data object by any of the user profiles associated with the data interaction platform computing entity 106. In some embodiments, a data object may be associated with one or more qualified security profiles that each governs rules and guidelines for accessing the data object by a subset of the user profiles associated with the data interaction platform computing entity 106.

For example, a particular data object may be associated with a universal access profile that indicates that the particular data object is accessible at all times by any of the user profiles associated with the data interaction platform computing entity 106. As another example, a particular data object may be associated with a universal access profile that indicates that the particular data object is accessible at all times by any of the user profiles associated with the data interaction platform computing entity 106 so long as the user profiles are estimated to be in a particular location. As yet another example, a particular data object may be associated with a universal access profile that indicates that the particular data object is accessible at all times by any of the user profiles associated with the data interaction platform computing entity 106 so long as the user profiles are estimated to be at a first location during a first time of day or at a second location during a second time of day.

As a further example, a particular data object may be associated with: (i) a first qualified security profile for a first set of one or more user profiles that indicates that the first set of user profiles can access the particular data object at all times and at all locations, (ii) a second qualified security profile for a second set of one or more user profiles that indicates that the second set of user profiles can access the particular data object at all times while at a first location, and (iii) a third qualified security profile for a third set of one or more user profiles that indicates that the third set of user profiles can access the particular data object at a first location during a first time of day or at a second location during a second time of day.

In some embodiments, the security profile for the particular data object profile defines one or more access criteria for the data object, where each access criterion of the plurality of access criteria may relate an access level of one or more access levels for the data object to a security environment of one or more security environments associated with the data interaction platform computing entity. In some embodiments, a security profile for the data object may indicate what the access level of each of one or more user profiles associated with the security profile is to the data associated with the data object given the security environment of the user profile at a time associated with a data access request by the user profile to access the data associated with the data object.

In some embodiments, an access level of the particular data object may be defined by a subset of the data associated with the particular data object, including any empty subset of such data and a subset of the data associated with the particular data object that includes all of the data associated with the particular data object. For example, given a data object that includes data fields F1-F10, a first access level may include data fields F1-F2, a second access level may include data fields F2, F4, and F6, and/or the like. In some embodiments, a security environment may be defined by one or more runtime parameter value ranges for one or more runtime parameters. For example, a particular security environment may be defined by at least one of a location-based runtime parameter value indicating a particular geographic area (e.g., a particular geographic area corresponding to a particular office of a particular company), a temporal runtime parameter value indicating a particular range of time within a week (e.g., every weekday between 9 AM and 5 PM), a network connection-based runtime parameter indicating a particular network connection used to connect to the data interaction platform computing entity 106 (e.g., a particular virtual private network (VPN) associated with a company), an environment-selection runtime parameter indicating an environment state selected by a user of the data interaction platform computing entity 106 (e.g., an environment state associated with work or leisure), a jurisdictional runtime parameter indicating a legal jurisdiction governing a user profile associated with the data access request, and/or the like.

In some embodiments, step/operation 1801 may be performed in accordance with the steps/operations of FIG. 19. The process depicted in FIG. 19 begins at step/operation 1901 when the security profile determination engine 111 determines one or more security features for each data object of a plurality of data objects, where plurality of data objects include a primary data object and one or more secondary data objects, and where each of the plurality of secondary data objects is associated with a security profile. In some embodiments, a security feature for a data object is any property of the data object that can be used to extrapolate the security profile of the data object. In some embodiments, at least some of the security features of a data object are determined based on features of the data object used to model the data object in a data modeling framework. For example, at least some of the security features of a data object may be determined based on absorption scores and/or relational awareness scores associated with a data object. As another example, at least some of the security features of a data object may be determined based on a hierarchical position of a data object vis-à-vis other data objects within a hierarchical data object scheme. As yet another example, at least some of the security features of a data object may be determined based on a relational position of a data object vis-à-vis other data objects within a relational data object scheme. As a further example, at least some of the security features of a data object may be determined based on a position of a data object within an object graph in a graph-based data modeling scheme.

In some embodiments, step/operation 1901 may be performed in accordance with the steps/operations depicted in FIG. 20. The process depicted in FIG. 20 begins at step/operation 2001 when the security profile determination engine 111 generates an individual absorption score for a particular data object. In some embodiments, the individual absorption score of the particular data object indicates an estimated relational awareness tendency of the particular data object given one or more individual attributes of the particular data object. For example, based at least in part on an example model for inferring individual absorption scores, a data object associated with a particular individual person having a high educational degree may be deemed to have a high absorption score. As another example, based at least in part on another example model for generating individual absorption scores, a data object a data object associated with a particular individual person having a particular physical profile (e.g., age, height, weight, and/or the like) may be deemed to have a high absorption score.

In some embodiments, step/operation 2001 can be performed in accordance with the process depicted in FIG. 20, which is a flowchart diagram of an example process for generating an individual absorption score for a particular data object. The process depicted in FIG. 20 begins at step/operation 2001 when the security profile determination engine 111 obtains one or more individual attributes for the particular data object.

At step/operation 2002, the security profile determination engine 111 generates a hierarchical absorption score for the particular data object. For example, the hierarchical absorption score for a particular data object that has a hierarchical parents P1, P2, and P3 may be determined based at least in part on individual absorption scores of P1, P2, and P3. In some embodiments, the hierarchical absorption score for the data object is determined based at least in part on each individual absorption score for a parent data object that is a hierarchical parent of the data object. In some embodiments, the one or more parent data objects for a particular data object include a hierarchical meta-type of the particular data object, where the hierarchical meta-type of the particular data object indicates whether the particular data object is comprising one or more related hierarchical meta-type designations of a plurality of predefined hierarchical meta-type designations.

In some embodiments, the plurality of predefined hierarchical meta-type designations include: a first predefined hierarchical meta-type designation associated with living real-world entities, a second predefined hierarchical meta-type designation associated with non-living-object real-world entities, a third predefined hierarchical meta-type designation associated with location-defining real-world entities, a fourth predefined hierarchical meta-type designation associated with time-defining real-world entities, a fifth predefined hierarchical meta-type designation associated with communication-defining entities, a sixth predefined hierarchical meta-type designation associated with group-defining entities, and a seventh predefined hierarchical meta-type designation associated with knowledge-defining entities.

At step/operation 2003, the security profile determination engine 111 generates an operational absorption score for the particular data object. In some embodiments, the operational absorption score for the data object is determined based at least in part on each individual absorption score for a related data object that is operationally related to the particular data object. In some embodiments, a related data object is deemed related to a particular data object if there is a non-hierarchical relationship between the two data objects. In some embodiments, the one or more related data objects for a particular data object of include one or more user-defining objects associated with the particular data object and one or more access-defining data objects associated with the particular data object. In some embodiments, the one or more user-defining objects associated with the particular data object include one or more primary user-defining objects associated with the particular data object and one or more collaborator user-defining objects associated with the particular data object. In some embodiments, the one or more access-defining data objects associated with the particular data object include one or more sharing space data objects associated with the particular data object (e.g., a public sharing space data object, a collaborator space object, a shared space object, and/or the like).

At step/operation 2004, the security profile determination engine 111 generates an attribute-based absorption score for the particular data object. In some embodiments, the attribute-based absorption score for the particular data object is performed based at least in part on each individual absorption score for a similar data object whose respective individual attributes are determined to be sufficiently similar to the one or more object attributes of the particular data object. In some embodiments, the security profile determination engine 111 generates a distance measure between each pair of data objects and determines particular pairs of data objects whose distance measure exceeds a threshold distance measure. In some of those embodiments, the security profile determination engine 111 generates an attribute-based absorption score for a particular data object based at least in part on any data object that is member of a particular pair of data objects that also includes the particular data object.

At step/operation 2005, the security profile determination engine 111 generates the relational awareness score for the particular data object based at least in part on the individual absorption score for the particular data object, the hierarchical absorption score for the particular data object, the operational absorption score for the particular data object, and the attribute absorption score for the particular data object. In some embodiments, to generate the relational awareness score for the particular data object, the security profile determination engine 111 applies a parameter to each of the individual absorption score for the particular data object, the hierarchical absorption score for the particular data object, the operational absorption score for the particular data object, and the attribute absorption score for the particular data object, where each parameter may be determined using a preconfigured absorption score generation model such as a generalized linear model and/or using a supervised machine learning algorithm for determining absorption scores.

At step/operation 2006, the security profile determination engine 111 generates the security features for the particular data object based on the relational awareness score for the particular data object. In some embodiments, the security features for the particular data object include at least one of the relational awareness score for the particular data object, the individual absorption score for the particular data object, the hierarchical absorption score for the particular data object, the operational absorption score for the particular data object, and the attribute-based absorption score for the particular data object. In some embodiments, to generate the security features for the particular data object, the security profile determination engine 111 maps at least one of the relational awareness score for the particular data object, the individual absorption score for the particular data object, the hierarchical absorption score for the particular data object, the operational absorption score for the particular data object, and the attribute-based absorption score for the particular data object into a multi-dimensional space configured to extrapolate at least some of the security features for the particular object based on a position of the particular data object in the multi-dimensional space. In some embodiments, the noted extrapolation may be performed using one or more unsupervised machine learning techniques.

Returning to FIG. 19, at step/operation 1902, the security profile determination engine 111 generates a security model extrapolation space based on each security features for a data object of the plurality of data objects. In some embodiments, a security model extrapolation space is any mapping of two or more data objects based on at least some of the security features of the two or more data objects. In some embodiments, distances between mappings of the data objects in the security model extrapolation space can be used to infer security profiles for the mapped data objects. For example, the mapped data objects can be divided into one or more object clusters based on the distances between mappings of the mapped data objects using one or more clustering algorithms. In some embodiments, the security profile of a particular data object in a particular cluster may be determined based on the security profiles of at least some of the mapped data objects in the same cluster as the particular data object. As another example, the security profile of a particular data object may be determined based on the security profiles of other mapped objects associated with the security model extrapolation space as well as distances between the mapping of the particular data object and the mappings of the other mapped data objects associated with the security model extrapolation space.

An operational example of a security model extrapolation space 2100 is presented in FIG. 21. As depicted in FIG. 21, the security model extrapolation space 2100 includes a mapping 2111 for a primary data object and mappings 2112-2116 for secondary data objects. The mappings 2111-2116 included in the security model extrapolation space 2100 are each defined based on a first mapping value associated with the security feature A which is modeled using the horizontal dimension 2101 of the security model extrapolation space 2100 as well as a second mapping value associated with the security feature B which is modeled using the vertical dimension 2102 of the security model extrapolation space 2100. Moreover, the mappings 2111-2116 included in the security model extrapolation space 2100 are divided into two object clusters 2121-2122 based on distances between the noted mappings 2111-2116. The two object clusters 2121-2122 include object cluster 2121 which includes mappings 2111-2113 and object cluster 2122 which includes mappings 2114-2116.

Returning to FIG. 19, at step/operation 1903, the security profile determination engine 111 determines the security model for the primary data object based on the security model extrapolation space. In some embodiments, to determine the security model for the primary data object based on the security model extrapolation space, the security profile determination engine 111 determines one or more related modeled data objects of the one or more modeled data objects based at least in part on the security model extrapolation space and subsequently determines the security profile for the data object based at least in part on each modeled security profile for a related modeled data object of the one or more related modeled data objects.

In some embodiments, the security profile determination engine 111 may divide the plurality of data objects into one or more object clusters based on the distances between mappings of the mapped data objects in the security profile extrapolation space and by using one or more clustering algorithms. In some embodiments, the security profile determination engine 111 may determine that the secondary data objects that are in the same object cluster as the primary data object according to the security profile extrapolation space are deemed to be related to the primary data object. In some of those embodiments, the security profile determination engine 111 may determine the security profile for the primary data object based on the security profiles of the secondary data objects that are in the same object cluster as the primary data object (e.g., the secondary data objects 2112-2113 that are in the same object cluster 2121 as the primary object cluster 2121 in the exemplary security profile extrapolation space 2100 of FIG. 21). In some embodiments, the security profile determination engine 111 may determine the security profile for the primary data object based on the security profiles of each of the secondary data objects when adjusted by the distances between the mapping of the primary data object and the mapping of each of the secondary data objects.

Returning to FIG. 18, step/operation 1801 may be performed in accordance with the steps/operations depicted in FIG. 22. The process depicted in FIG. 22 begins at step/operation 2201 when the security profile determination engine 111 determines an activation status for the data object. In some embodiments, the activation status for the data object indicates whether the data object is accessible at all by an associated set of user profiles associated with the data interaction platform computing entity 106. For example, a particular data object may be inaccessible by lower-level user profiles associated with the data interaction platform computing entity 106. As another example, a particular data object may be inaccessible by all of the user profiles associated with the data interaction platform computing entity 106. Examples of inactive data objects may include data objects associated with deceased individuals, former employees, past events, completed projects, and/or the like.

At step/operation 2202, the security profile determination engine 111 determines whether the activation status indicates an active status or an inactive status. If the activation status indicates an inactive status: (i) at step/operation 2203, the security profile determination engine 111 determines a denied access criterion that prevents access of the data object by user profiles associated with the activation status, and (ii) at step/operation 2204, the security profile determination engine 111 determines the security profile for the data object with respect to the user profiles associated with the activation status based on the denied access criterion. However, if the activation status indicates an active status: (i) at step/operation 2205, the security profile determination engine 111 determines a qualified access criterion that enables access of at least some of the data associated with the data object by user profiles associated with the activation status, and (ii) at step/operation 2206, the security profile determination engine 111 determines the security profile for the data object with respect to the user profiles associated with the activation status based on the qualified access criterion.

Returning to FIG. 18, at step/operation 1802, the request processing engine 112 of the data interaction platform computing entity 106 receives a data access request associated with the data object, where the data access request is associated with one or more runtime parameters associated with the data access request. In some embodiments, a runtime parameter associated with a data access request is any property of a request session during which the data access request is generated and/or received. For example, a location-based runtime parameter may describe a location of a request session. As another example, a temporal runtime parameter may describe a time of a request session. As yet another example, a network-connection-based runtime parameter may describe a network connection used to transmit the data access request during the request session. As a further example, an environment-selection runtime parameter may describe a user selected environment state (e.g., an environment state selected using the environment selection user interface 410 of FIG. 13). In general, a runtime parameter may describe any dynamic property of a data access request that cannot be determined before runtime of a computer-implemented procedure used to generate and transmit the data access request.

In some embodiments, the data access request is generated in accordance with a first end user attempt share data with a second end user using a content sharing message, e.g., a content sharing message using an external communication means (e.g., an external email communication means) that is external to a data interaction platform associated with the data interaction platform computing entity 106 and/or an using an internal communication means that is within a data interaction platform associated with the data interaction platform computing entity 106. In some embodiments, the data access request is generated in accordance with a first end user attempt to communicate data to a second end user, e.g., a content sharing message using an external communication means (e.g., an external email communication means) that is external to a data interaction platform associated with the data interaction platform computing entity 106 and/or a using an internal communication means that is within a data interaction platform associated with the data interaction platform computing entity 106. Performing dynamic security enforcement with respect to data sharing and data communication is performed in greater detail below with reference to FIGS. 23-28.

At step/operation 1803, the request processing engine 112 determines a selected security environment for the data access request, wherein the selected security environment based at least in part on the one or more runtime parameters. In some embodiments, the request processing engine 112 determines the selected security environment from a group of security environments associated with the data interaction platform computing entity 106. In some embodiments, the request processing engine 112 determines the selected security environment based on at least one of a location-based runtime parameter value indicating a particular geographic area (e.g., a particular geographic area corresponding to a particular office of a particular company), a temporal runtime parameter value indicating a particular range of time within a week (e.g., every weekday between 9 AM and 5 PM), a network connection-based runtime parameter indicating a particular network connection used to connect to the data interaction platform computing entity 106 (e.g., a particular virtual private network (VPN) associated with a company), an environment-selection runtime parameter indicating an environment state selected by a user of the data interaction platform computing entity 106 (e.g., an environment state associated with work or leisure), and/or the like.

In some embodiments, the request processing engine 112 selects a selected security environment for the data access request based on one or more security environment selection guidelines. The security environment selection guidelines may define at least one of a priority order between the runtime parameters as well as equations for combining runtime parameters to determine relevance scores for each of the group of security environments associated with the data interaction platform computing entity 106 given the runtime parameters. For example, in some embodiments, security environment selection guidelines may indicate that, given an environment-selection runtime parameter, the selected security environment may be determined based on the environment selection runtime parameter unless a threshold amount of time has passed since a time associated with the generation of the environment-selection runtime parameter (e.g., unless the environment-selection runtime parameter has expired). As another example, in some embodiments, security environment selection guidelines may indicate that a location-based runtime parameter is twice more important than a temporal runtime parameter in determining a selected security environment for a data access request.

In some embodiments, at least some of the runtime parameters associated with a data access request are supplied to a machine learning model (e.g., a supervised machine learning model and/or an unsupervised machine learning model), where the machine learning model is configured to generate a selected security environment associated with a data access request. In some embodiments, at least some of the runtime parameters associated with a data access request are supplied to a machine learning model (e.g., a supervised machine learning model and/or an unsupervised machine learning model), where the machine learning model is configured to generate a probability score for each security environment in the group of security environments associated with the data interaction platform computing entity 106, and where the request processing engine 112 is configured to determine the selected security environment from the group of security environments associated with the data interaction platform computing entity 106 based on the probability scores generated by the machine learning model for each security environment in the group of security environments associated with the data interaction platform computing entity 106.

At step/operation 1804, the security profile enforcement engine 113 determines a selected access level for the data object based on the security profile for the data object and the selected security environment for the data access request. In some embodiments, the security profile enforcement engine 113 identifies an access criterion associated with the security profile that corresponds to the selected security environment, identifies the access level associated with the access criterion, and adopts the identified access level as the selected access level associated with the data access request.

In some embodiments, the security profile enforcement engine 113 determines, based on the selected security environment, one or more future security environments of the data access request at temporal units near a current temporal unit and adopts an access level that satisfies the selected security environment as well as the one or more future security environments. For example, if the security profile enforcement engine 113 determines that a user profile associated with a data access request is currently at a work location but is about to leave the work location, the security profile enforcement engine 113 may determine that the data access request should be associated with a non-work-related access level rather than a work-related access level. As another example, if the security profile enforcement engine 113 is expected to be in China in a number of days, the security profile enforcement engine 113 may determine a selected access level for China even if the jurisdictional runtime parameter of the end user does not currently correspond to China.

At step/operation 1805, the security profile enforcement engine 113 processes the data access request based on the selected access level. In some embodiments, to process the data access request based on the selected access level, the security profile enforcement engine 113 ensures any communication of data between the data interaction platform computing entity 106 and a client computing entity 102 associated with the data access request is in accordance with the selected access level. In some embodiments, processing the data access request based at least in part on the selected access level includes generating a refined version of the data object in accordance with the selected access level and providing the refined version to a client computing entity associated with the data access request.

In some embodiments, the selected access level controls, in addition to and/or instead of the level of access of the client computing entity 102 associated with the data access request to the data associated with the data object, the level of access of the data interaction platform computing entity 106 to the data associated with client computing entity 102. For example, in some embodiments, a jurisdictional runtime parameter may be used to determine a selected security environment and a selected access level that prevents the data interaction platform computing entity 106 from gathering personal data (e.g., Hyper-Text Transfer Protocol (HTTP) cookie data) associated with a client computing entity 102 and/or a user profile associated with the client computing entity 102. In some embodiments, when an end user in Europe, selection of security environments and access levels may be performed in a manner that limits the ability of the data interaction platform computing entity 106 from gathering browsing data associated with an end user in accordance with European data privacy regulations.

Runtime-Dynamic Data Sharing and Data Communication

The dynamic security enforcement concepts discussed herein can be utilized to enhance data security in any data interaction applications. Examples of such data interaction applications including data sharing applications and data communication applications. A data sharing application (e.g., a collaboration document management application and/or a collaborative data management application) may enable user profiles to share data with one another and/or with user profiles outside the data sharing application. A data communication application (e.g., a messaging application and/or an email application) may enable user profiles to communicate with one another and/or with user profiles outside the data communication application.

An operational example of performing dynamic security enforcement with respect to data sharing is presented in FIGS. 23-26. FIG. 23 depicts a data object hierarchy 2300 for a data object A 2301A. As depicted in the data object hierarchy 2300, the data object is a parent of data object B 2301, which in turn is a parent of data objects D-E 2301D-E; as well as data object C 2301C. The dynamic security enforcement concepts discussed herein enable defining various access levels with respect to the data object hierarchy 2300, such as the access levels AL1-AL4 whose respective access privileges are depicted in the access level definition data 2400 of FIG. 24. As depicted in the access level definition data 2400, access level AL1 is associated with data objects A-E 2301A-E, access level AL2 is associated with data objects A-B 2301A-B as well as data objects D-E 2301 D-E, access level AL3 is associated with data objects A-C 2301A-C, and access level AL4 is associated with the data objects A-B 2301A-B.

The dynamic security enforcement concepts discussed herein further enable defining various security environments based on combinations of runtime parameter value ranges. For example, as depicted in the security environment definition data 2500 of FIG. 25, security environment SE1 is associated with the value L1 for the location-based runtime parameter and the value T1 for the temporal runtime parameter, security environment SE2 is associated with the value L1 for the location-based runtime parameter and the value T2 for the temporal runtime parameter, security environment SE3 is associated with the value L2 for the location-based runtime parameter and the value T1 for the temporal runtime parameter, and security environment SE4 is associated with the value L2 for the location-based runtime parameter and the value T2 for the temporal runtime parameter.

The dynamic security enforcement concepts discussed herein further enable defining security profiles for accessing the data object A 2301A based on associating access levels AL1-AL4 and security environments SE1-SE4. For example, as depicted in the security profile definition data 2600 of FIG. 26, the defined security profiles includes the following access criterions: access criterion AC1 which associates security environment SE1 with the access level AL1, access criterion AC2 which associates security environment SE2 with the access level AL2, access criterion AC3 which associates security environment SE3 with the access level AL3, and access criterion AC4 which associates security environment SE4 with the access level AL4. The defined security profile can now be utilized to share the data associated with the data object A 2301A in a manner that has both static sharing properties and dynamic runtime sharing properties. Such dynamic definition of sharing parameters can enhance security and efficiency of data sharing applications.

An operational example of performing dynamic security enforcement with respect to data communication is presented in FIGS. 27-28. FIG. 27 depicts cross-user access privilege data 2700 for a shared communication 2701 having seven parts 2702, where an initiating user profile intends to share different partitions of the seven shared communication parts 2702 with different user groups 2703. For example, the shared communication 2701 may include meeting notes for different individuals who have attended a meeting, where only particular portions of the meeting notes are relevant to particular users. To accomplish the noted goal of partitioned communication of the shared communication parts 2702 between the user groups 2703, an initiating user profile may define access levels each associated with a different combination of the shared communication parts 2701, define security environments based on user groups and/or runtime parameters, and define a security profile for the shared communication 2701 based on associating access levels and security environments. The defined security profile may then be used to generate partitioned communications having the structure defined by the cross-user communication partition user interface 2800 of FIG. 28, where each user group is allowed to access particular parts of the shared communication 2701.

VI. CONCLUSION

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous. Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing dynamic access security enforcement with respect to a data object stored on a data interaction platform computing entity, the computer-implemented method comprising:
    determining a security profile for the data object, wherein:
        (i) the security profile defines one or more access criteria for the data object, (ii) each access criterion of the plurality of access criteria relates an access level of one or more access levels for the data object to a security environment of one or more security environments associated with the data interaction platform computing entity, and (iii) determining the security profile for the data object comprises:
            determining one or more security features for each data object of a plurality of data objects, wherein: (i) the plurality of data objects comprise the data object and one or more modeled data objects, and (ii) each modeled data object of the one or more modeled data objects is associated with a modeled security profile;
            generating a security model extrapolation space based at least in part on each one or more security features for a data object of the plurality of data objects;
            determining one or more related modeled data objects of the one or more modeled data objects based at least in part on the security model extrapolation space; and
            determining the security profile for the data object based at least in part on each modeled security profile for a related modeled data object of the one or more related modeled data objects;
    receiving a data access request associated with the data object, wherein the data access request is associated with one or more runtime parameters associated with the data access request;
    determining, based at least in part on the one or more runtime parameters, a selected security environment for the data access request, wherein the selected security environment is selected from the plurality of security environments associated with the data interaction platform computing entity;
    determining, based at least in part on the selected security environment and the security profile, a selected access level of the plurality of access levels for the data object; and
    processing the data access request based at least in part on the selected access level by generating a refined version of the data object in accordance with the selected access level and providing the refined version to a client computing entity associated with the data access request.

2. The computer-implemented method of claim 1, wherein:
    the security profile is defined with respect to a first user profile of one or more user profiles associated with the data interaction platform computing entity, and
    the data access request is associated with the first user profile.

3. The computer-implemented method of claim 1, wherein:
    the security profile is defined with respect to a selected set of user profiles of one or more user profiles associated with the data interaction platform computing entity,
    the selected set of user profiles are defined based at least in part on one or more relational requirements, and
    the data access request is associated with a first user profile in the selected set of user profiles.

4. The computer-implemented method of claim 1, wherein the one or more runtime parameters comprise a location-based runtime parameter.

5. The computer-implemented method of claim 1, wherein the one or more runtime parameters comprise a network-connection-based runtime parameter.

6. The computer-implemented method of claim 1, wherein the one or more runtime parameters comprise a jurisdictional runtime parameter.

7. The computer-implemented method of claim 1, wherein the one or more runtime parameters comprise a temporal runtime parameter.

8. The computer-implemented method of claim 1, wherein the one or more runtime parameters comprise an environment-selection runtime parameter.

9. The computer-implemented method of claim 1, wherein:
    the one or more access levels comprise a denied access level, a full access level, and one or more partial access levels, and
    each partial access level of the one or more partial access levels is associated with a corresponding subset of a plurality of data items associated with the data object.

10. The computer-implemented method of claim 1, wherein the security profile further defines one or more end-user privacy criteria for the data object.

11. The computer-implemented method of claim 1, wherein the one or more security features for the data object comprise a relational awareness score.

12. The computer-implemented method of claim 11, wherein determining the relational awareness score comprises:
    determining an individual absorption score, wherein the individual absorption score for the data object indicates an estimated relational awareness tendency of the data object given one or more individual attributes of the data object;
    determining a hierarchical absorption score, wherein the hierarchical absorption score for the data object is determined based at least in part on each individual absorption score for a parent data object that is a hierarchical parent of the data object;
    determining an operational absorption score, wherein the operational absorption score for the data object is determined based at least in part on each individual absorption score for a related data object that is operationally related to the data object; and determining the relational awareness score based at least in part on the individual absorption score for the data object, the hierarchical absorption score for the data object, and the operational absorption score for the data object.

13. The computer-implemented method of claim 1, wherein determining the security profile for the data object comprises:

determining an activation status associated with the data object; and determining the security profile based at least in part on the activation status.

14. The computer-implemented method of claim 13, wherein determining the security profile based at least in part on the activation status comprises:

determining whether the activation status indicates an inactive status;

in response to determining that the activation status indicates the inactive status, determining the security profile based at least in part on a denied access criterion.

15. The computer-implemented method of claim 1, wherein:

the data object is a communication data object, and processing the data access request based at least in part on the selected access level comprises generating a partitioned communication data object.

16. The computer-implemented method of claim 1, wherein:

the data object is a shared data object, and processing the data access request based at least in part on the selected access level comprises generating a customized shared data object.

17. An apparatus for performing dynamic access security enforcement with respect to a data object stored on a data interaction platform computing entity, the apparatus comprising at least one processor and at least one memory including program code, the at least one memory and the program code configured to, with the processor, cause the apparatus to at least:

determine a security profile for the data object, wherein: (i) the security profile defines one or more access criteria for the data object, (ii) each access criterion of the plurality of access criteria relates an access level of one or more access levels for the data object to a security environment of one or more security environments associated with the data interaction platform computing entity, and (iii) determining the security profile for the data object comprises:

determining one or more security features for each data object of a plurality of data objects, wherein: (i) the plurality of data objects comprise the data object and one or more modeled data objects, and (ii) each modeled data object of the one or more modeled data objects is associated with a modeled security profile;

generating a security model extrapolation space based at least in part on each one or more security features for a data object of the plurality of data objects;

determining one or more related modeled data objects of the one or more modeled data objects based at least in part on the security model extrapolation space; and determining the security profile for the data object based at least in part on each modeled security profile for a related modeled data object of the one or more related modeled data objects;

receive a data access request associated with the data object, wherein the data access request is associated with one or more runtime parameters associated with the data access request;

determine, based at least in part on the one or more runtime parameters, a selected security environment for the data access request, wherein the selected security environment is selected from the plurality of security environments associated with the data interaction platform computing entity;

determine, based at least in part on the selected security environment and the security profile, a selected access level of the plurality of access levels for the data object; and process the data access request based at least in part on the selected access level by generating a refined version of the data object in accordance with the selected access level and providing the refined version to a client computing entity associated with the data access request.

18. The apparatus of claim 17, wherein:

the security profile is defined with respect to a first user profile of one or more user profiles associated with the data interaction platform computing entity, and the data access request is associated with the first user profile.

19. A computer program product for performing dynamic access security enforcement with respect to a data object stored on a data interaction platform computing entity, the computer program product comprising at least one non-transitory computer-readable storage medium having computer-readable program code portions stored therein, the computer-readable program code portions configured to:

determine a security profile for the data object, wherein: (i) the security profile defines one or more access criteria for the data object, (ii) each access criterion of the plurality of access criteria relates an access level of one or more access levels for the data object to a security environment of one or more security environments associated with the data interaction platform computing entity, and (iii) determining the security profile for the data object comprises:

determining one or more security features for each data object of a plurality of data objects, wherein: (i) the plurality of data objects comprise the data object and one or more modeled data objects, and (ii) each modeled data object of the one or more modeled data objects is associated with a modeled security profile;

generating a security model extrapolation space based at least in part on each one or more security features for a data object of the plurality of data objects;

determining one or more related modeled data objects of the one or more modeled data objects based at least in part on the security model extrapolation space; and determining the security profile for the data object based at least in part on each modeled security profile for a related modeled data object of the one or more related modeled data objects;

receive a data access request associated with the data object, wherein the data access request is associated with one or more runtime parameters associated with the data access request;

determine, based at least in part on the one or more runtime parameters, a selected security environment for the data access request, wherein the selected security environment is selected from the plurality of security environments associated with the data interaction platform computing entity;

determine, based at least in part on the selected security environment and the security profile, a selected access level of the plurality of access levels for the data object; and process the data access request based at least in part on the selected access level by generating a refined version of the data object in accordance with the selected access level and providing the refined version to a client computing entity associated with the data access request.

* * * * *